(12) United States Patent
Isaji et al.

(10) Patent No.: US 10,714,732 B2
(45) Date of Patent: Jul. 14, 2020

(54) CURRENT COLLECTING LEAD AND PRODUCTION METHOD FOR SECONDARY BATTERY INCLUDING CURRENT COLLECTING LEAD

(71) Applicant: FDK CORPORATION, Tokyo (JP)

(72) Inventors: Hidefumi Isaji, Tokyo (JP); Hiroyuki Shibaoka, Tokyo (JP); Isao Mugima, Tokyo (JP); Tomomi Nakamura, Tokyo (JP); Tetsu Yamanaka, Tokyo (JP)

(73) Assignee: FDK CORPORATION, Tokyo (JP)

( * ) Notice: Subject to any disclaimer, the term of this patent is extended or adjusted under 35 U.S.C. 154(b) by 220 days.

(21) Appl. No.: 15/868,922

(22) Filed: Jan. 11, 2018

(65) Prior Publication Data

US 2018/0219206 A1 Aug. 2, 2018

(30) Foreign Application Priority Data

Jan. 30, 2017 (JP) .................................. 2017-014551
Mar. 29, 2017 (JP) .................................. 2017-065987

(51) Int. Cl.
*H01M 2/26* (2006.01)
*H01M 10/28* (2006.01)
(Continued)

(52) U.S. Cl.
CPC ......... *H01M 2/263* (2013.01); *H01M 10/286* (2013.01); *H01M 10/30* (2013.01);
(Continued)

(58) Field of Classification Search
None
See application file for complete search history.

(56) References Cited

U.S. PATENT DOCUMENTS 6,465,122 B1 * 10/2002 Kitaoka ............. H01M 2/1276
29/623.2
2009/0208830 A1 8/2009 Okabe et al.

FOREIGN PATENT DOCUMENTS

EP 1079449 A1 2/2001
EP 2182566 A1 5/2010
(Continued)

OTHER PUBLICATIONS

Extended European Search Report, for European Patent Application No. 18153869.5, dated May 8, 2018, 8 pages.

*Primary Examiner* — Jeremiah R Smith
(74) *Attorney, Agent, or Firm* — Kinney & Lange, P.A.

(57) ABSTRACT

A current collecting lead is interposed between a sealing body and a positive electrode current collector for connecting the sealing body and the positive electrode current collector, the sealing body including a positive electrode terminal, the positive electrode current collector being attached to an electrode group, the current collecting lead including: a top wall portion positioned on the side of the sealing body; leg portions positioned on the side of the positive electrode current collector and that face the top wall portion; and a pair of side wall portions that extend between side edges of the top wall portion and side edges of the leg portions and that face each other, a first corner portion and a second corner portion formed by the top wall portion and the side wall portions and a third corner portion and a fourth corner portion formed by the leg portions and the side wall portions being rounded corners that are curved.

5 Claims, 17 Drawing Sheets

(51) Int. Cl.
    *H01M 10/30*     (2006.01)
    *H01M 2/20*     (2006.01)
    *H01M 2/04*     (2006.01)

(52) U.S. Cl.
    CPC .......... *H01M 2/0408* (2013.01); *H01M 2/202* (2013.01); *H01M 2220/30* (2013.01)

(56) References Cited

FOREIGN PATENT DOCUMENTS

| | | | | |
|---|---|---|---|---|
| JP | 3547931 B2 | | 7/2004 | |
| JP | 2004-235036 | * | 8/2004 | .............. H01M 2/22 |
| JP | 2004235036 | | 8/2004 | |

* cited by examiner

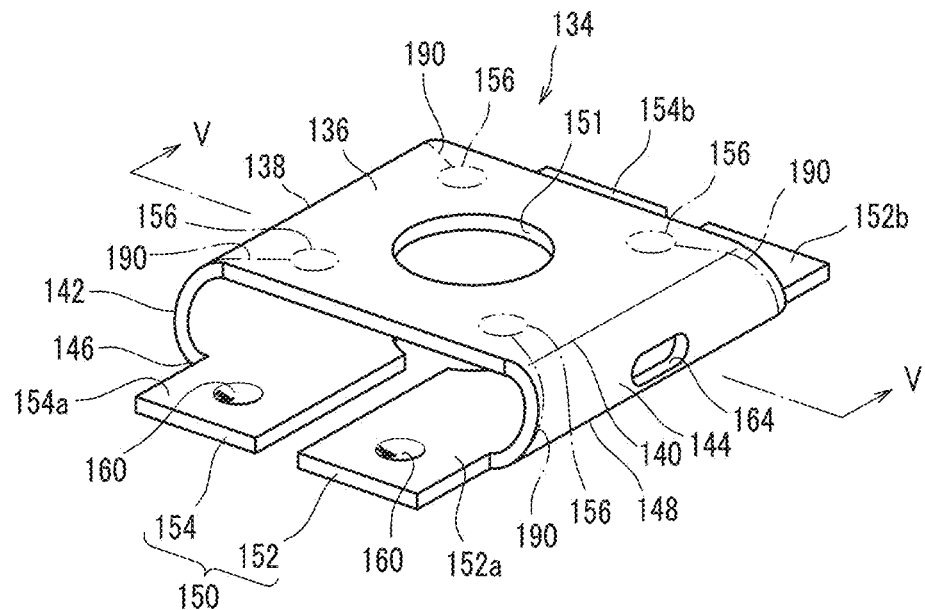

CURRENT COLLECTING LEAD AND PRODUCTION METHOD FOR SECONDARY BATTERY INCLUDING CURRENT COLLECTING LEAD

CROSS-REFERENCE TO RELATED APPLICATION

This application claims the priority benefit of Japanese Application No. 2017-014551 filed on Jan. 30, 2017, and of Japanese Application No. 2017-065987 filed on Mar. 29, 2017. Japanese Application Nos. 2017-014551 and 2017-065987 are both incorporated herein by reference.

BACKGROUND

Field of the Invention

The present invention relates to a current collecting lead and a production method for a secondary battery including the current collecting lead.

Description of the Related Art

The use of rechargeable secondary batteries has been expanded, and a type of battery that can be charged and discharged at a high rate has been developed. As such a battery, for example, a cylindrical alkaline secondary battery described below is known.

The cylindrical alkaline secondary battery is formed by placing an electrode group into an outer can having a bottomed cylindrical shape together with an alkaline electrolyte and tightly closing an opening portion of the outer can with a sealing body including a positive electrode terminal.

The above electrode group is formed by spirally winding a positive electrode and a negative electrode that are overlapped while a separator is interposed between them, and has a nearly columnar shape, as a whole. Here, at the time of the winding, the positive electrode and the negative electrode are disposed so as to slightly deviate from each other in a direction along the axis line of the electrode group, and the separator having a predetermined size is disposed at a predetermined position between the positive electrode and the negative electrode. Then, in this state, the positive electrode, the separator and the negative electrode are wounded. As a result, an edge portion of the positive electrode spirally protrudes from one end face side of the electrode group, and an edge portion of the negative electrode spirally protrudes from the other end face side of the electrode group.

A positive electrode current collector is welded to the protruding edge portion of the positive electrode, and a negative electrode current collector is welded to the protruding edge portion of the negative electrode. Thereby, the positive electrode current collector is electrically connected with the positive electrode in a wide range, and the negative electrode current collector is electrically connected with the negative electrode in a wide range, and therefore, the current collecting efficiency is improved. As a result, the battery allows a high-rate charge/discharge.

As a procedure of the assembly of the cylindrical alkaline secondary battery, for example, first, the electrode group is inserted into the outer can, and the inner surface of the bottom wall of the outer can and the negative electrode current collector are welded. Thereby, the outer can, which serves also as a negative electrode terminal, and the negative electrode are electrically connected. Next, one end of a positive electrode ribbon formed of a thin plate made of metal is welded to a predetermined position of the positive electrode current collector. Furthermore, the other end of the positive electrode ribbon is welded to a predetermined position of the sealing body. Thereby, the positive electrode terminal and the positive electrode are electrically connected. Thereafter, the sealing body is fitted into an upper end opening portion of the outer can while an insulating gasket is interposed, and the upper end opening portion of the outer can is crimped, so that the outer can is tightly closed. Thereby, the cylindrical alkaline secondary battery is formed.

As the above positive electrode ribbon, a relatively long ribbon is used for ease of the welding to the sealing body. Further, when the sealing body is fitted into the upper end opening portion of the outer can, the positive electrode ribbon is placed in the outer can so as to be bent between the sealing body and the electrode group. Therefore, as the positive electrode ribbon, a relatively thin ribbon is used for ease of the bending.

In recent years, for the alkaline secondary battery, a higher performance is demanded, and particularly, it is demanded to further enhance the high-rate discharge characteristic such that a high electric current can be efficiently output.

For enhancing the high-rate discharge characteristic, it is necessary to decrease the internal resistance of the battery as much as possible. However, in the case of using the thin and long belt-like positive electrode ribbon described above, the specific resistance of the positive electrode ribbon is high, and the positive electrode ribbon causes the increase in the internal resistance of the battery.

Hence, various studies for shortening an energizing path compared to the conventional art have been performed in order to further decrease the internal resistance of the battery and obtain a battery having a good high-rate discharge characteristic. As such a battery in which a measure for shortening the energizing path is taken, for example, there is known a battery shown in Japanese Patent No. 3547931 (hereinafter, Patent Literature 1).

Batteries as typified by Patent Literature 1 take a measure of using a thicker and shorter current collecting lead compared to the conventional positive electrode ribbon. Specifically, at the time of the assembly of the battery in Patent Literature 1, a current collecting lead with a predetermined shape shown in FIG. 1 and the like of Patent Literature 1 is welded onto the positive electrode current collector. Next, the sealing body is disposed in the opening portion of the outer can with the insulating gasket, and the battery is sealed by crimping the opening end rim of the outer can inward, so that the battery is assembled. At the time point of the sealing, the current collecting lead and the sealing body are in a contact state. Thereafter, the energization between the positive electrode terminal and negative electrode terminal of the battery is performed, and thereby, the resistance spot welding between the current collecting lead of the positive electrode and the sealing body is performed.

According to the battery in Patent Literature 1, it is possible to perform the welding between the current collecting lead and the sealing body after sealing the outer can, and therefore, it is not necessary to perform the welding between the current collecting lead and the sealing body before sealing the outer can. Thereby, it is possible to easily fit the sealing body into the opening portion of the outer can, even when the current collecting lead is short. When the current collecting lead is short in this way, it is possible to shorten the energizing path, and therefore, it is possible to reduce the internal resistance of the battery. Further, according to the battery in Patent Literature 1, it is not necessary to bend the current collecting lead in the outer can, and it is possible to use a current collecting lead that is thicker than the positive electrode ribbon. When a thicker current collecting lead is used in this way, it is possible to thicken the energizing path, and thereby, it is possible to reduce the internal resistance of the battery.

Thus, the battery in Patent Literature 1 has a good high-rate discharge characteristic because the internal resistance of the battery is lower compared to the conventional battery.

Meanwhile, at the time of fitting the sealing body into the outer can by crimping the upper end opening rim of the outer can or at the time of the resistance spot welding of the current collector, the current collecting lead and the sealing body, a compressive load acts on the battery along the axis line direction. When such a compressive load acts, the current collector deforms and presses the electrode group. On this occasion, in the battery, there is a concern that the internal short-circuit is caused, for example, by the folding of the edge portion of the positive electrode or negative electrode of the electrode group.

SUMMARY

The present disclosure provides a current collecting lead for a secondary battery, the current collecting lead being interposed between a sealing body and a current collector for connecting the sealing body and the current collector, the sealing body including a terminal, the current collector being attached to an electrode group, the current collecting lead including: a top wall that is positioned on the side of the sealing body; a bottom wall that is positioned on the side of the current collector and that faces the top wall; and a pair of side walls that extend between side edges of the top wall and side edges of the bottom wall and that face each other, corner portions formed by the top wall and the side walls and corner portions formed by the bottom wall and the side walls being rounded corners that are curved.

BRIEF DESCRIPTION OF THE DRAWINGS

The present invention will become more fully understood from the detailed description given hereinafter and the accompanying drawings which are given by way of illustration only, and thus, are not limitative of the present invention, and wherein:

FIG. 17 is a perspective view showing a current collecting lead in the second embodiment in a state where a bottom wall side is an upper side.

FIG. 18 is a perspective view showing the current collecting lead in the second embodiment in a state where a top wall side is an upper side.

DETAILED DESCRIPTION

First Embodiment

In the following, an alkaline secondary battery including a current collecting lead according to a first embodiment of the present invention will be described with reference to the drawings.

An AA-size cylindrical nickel-hydrogen secondary battery (hereinafter, referred to as a battery 1) shown in FIG. 1 will be described as an example of the secondary battery in the first embodiment to which the present invention is applied.

The battery 1 includes an outer can 2 having a bottomed cylindrical shape in which an upper end is opened, the outer can 2 has electric conductivity, and a bottom wall thereof functions as a negative electrode terminal. In the outer can 2, an electrode group 4 is placed together with a predetermined amount of alkaline electrolyte (not illustrated).

Figure 1:
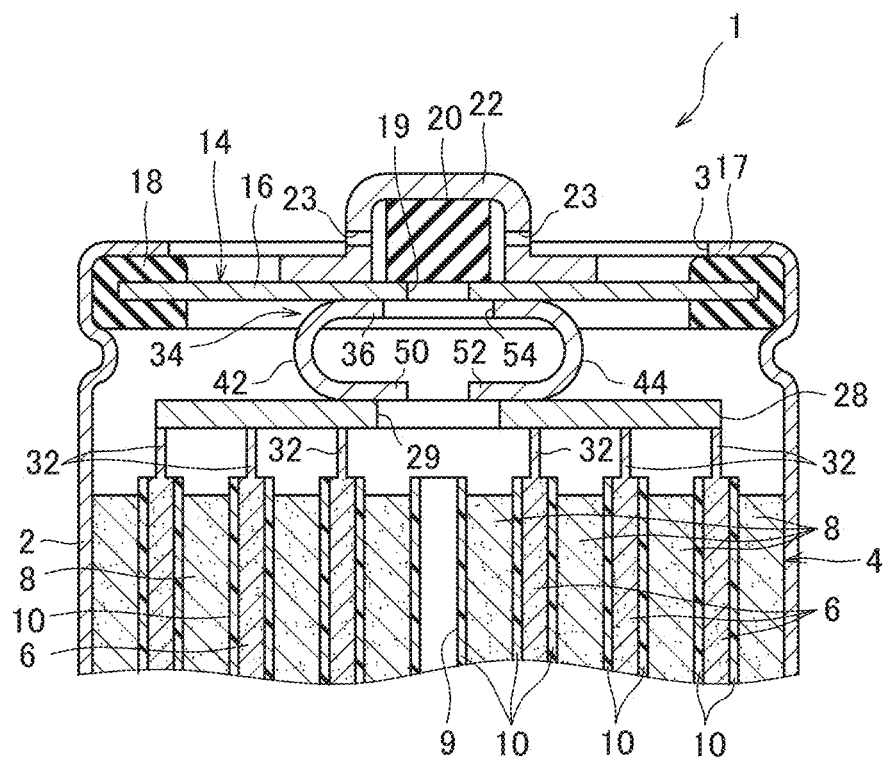
FIG. 1 is a partial cross-sectional view showing a first embodiment of a cylindrical nickel-hydrogen secondary battery according to the present invention.

As shown in FIG. 1, an opening 3 of the outer can 2 is closed by a sealing body 14. The sealing body 14 includes a disc-shaped lid plate 16 having electric conductivity, and a valve body 20 and a positive electrode terminal 22 that are provided on the lid plate 16. At an outer peripheral portion of the lid plate 16, a ring-shaped insulating gasket 18 is disposed so as to surround the lid plate 16. The insulating gasket 18 and the lid plate 16 are fixed to an opening rim 17 of the outer can 2, by crimping the opening rim 17 of the outer can 2. That is, the lid plate 16 and the insulating gasket 18 seal the opening 3 of the outer can 2, in cooperation with each other. Here, the lid plate 16 has a central through-hole 19 at the center, and the valve body 20 made of rubber is disposed on the outer surface of the lid plate 16, so as to close the central through-hole 19. Furthermore, the cylindrical positive electrode terminal 22 with a flange is electrically connected with the outer surface of the lid plate 16, so as to cover the valve body 20. The positive electrode terminal 22 depresses the valve body 20 toward the lid plate 16. Further, the positive electrode terminal 22 has a venting hole 23 on the side surface.

In normal times, the central through-hole 19 is closed by the valve body 20, in an airtight manner. Meanwhile, when gas is generated in the interior of the outer can 2 and the pressure of the gas is increased, the valve body 20 is compressed by the pressure of the gas so that the central through-hole 19 is opened. As a result, the gas is released from the interior of the outer can 2 to the exterior through the central through-hole 19 and the venting hole 23 of the positive electrode terminal 22. That is, the central through-hole 19, the valve body 20 and the venting hole 23 of the positive electrode terminal 22 form a safety valve for the battery 1.

The electrode group 4 includes a positive electrode 6, a negative electrode 8 and a separator 10 that have belt-like shapes respectively, and they are spirally wound while the separator 10 is interposed between the positive electrode 6 and the negative electrode 8. That is, the positive electrode 6 and the negative electrode 8 are overlapped on each other, with the separator 10 therebetween. The electrode group 4 formed in this way has a columnar shape as a whole.

In the electrode group 4, from one end face, an edge portion of the positive electrode 6 is spirally exposed, and from the other end face, an edge portion of the negative electrode 8 is spirally exposed. Here, the exposed edge portion of the positive electrode 6 is referred to as a positive electrode connection edge portion 32, and the exposed edge portion of the negative electrode 8 is referred to as a negative electrode connection edge portion (not illustrated). To the exposed positive electrode connection edge portion 32 and negative electrode connection edge portion, a positive electrode current collector 28 and a negative electrode current collector (not illustrated), which will be described later, are welded, respectively.

The negative electrode 8 includes a conductive negative electrode core body having a belt-like shape, and in the negative electrode core body, a negative electrode mixture is held.

The negative electrode core body is formed of a belt-like metal member in which many through-holes (not illustrated) passing in the thickness direction are distributed. As such a negative electrode core body, for example, a punching metal sheet can be used.

The negative electrode mixture is filled into the through-holes of the negative electrode core body, and in addition, is held as layers on both surfaces of the negative electrode core body.

The negative electrode mixture contains particles of a hydrogen storage alloy, a conducting material, a binding agent and the like. Here, the hydrogen storage alloy is an alloy capable of storing and releasing hydrogen that is a negative electrode active material, and hydrogen storage alloys that are typically used in nickel-hydrogen secondary batteries are suitably used. The above binding agent has a function to bind the particles of the hydrogen storage alloy and the conducting material to each other and therewith bind the negative electrode mixture to the negative electrode core body. Here, as the conducting material and the binding agent, materials that are typically used in nickel-hydrogen secondary batteries are suitably used.

For example, the negative electrode 8 can be produced as follows.

First, hydrogen storage alloy powders composed of the hydrogen storage alloy particles, the conducting material, the binding agent and water are mixed and kneaded, and a paste of the negative electrode mixture is prepared. The obtained paste of the negative electrode mixture is applied on the negative electrode core body, and is dried. After the drying, for the negative electrode core body to which the negative electrode mixture containing the hydrogen storage alloy particles and the like is attached, rolling and cutting are performed, so that an intermediate product for the negative electrode is obtained. The intermediate product for the negative electrode has an oblong shape as a whole. Then, for a predetermined edge portion that is in the intermediate product for the negative electrode and where the negative electrode connection edge portion is to be formed, the negative electrode mixture is removed. Thereby, the predetermined edge portion becomes the negative electrode connection edge portion where the negative electrode core body is uncovered. Thus, the negative electrode 8 having the negative electrode connection edge portion is obtained. Here, the removal method for the negative electrode mixture is not particularly limited, and for example, the removal by giving ultrasonic vibration is suitably performed. The region other than the negative electrode connection edge portion is still in a state where the negative electrode mixture is held.

Next, the positive electrode 6 will be described.

The positive electrode 6 contains a conductive positive electrode base material having a porous structure with many vacancies, and a positive electrode mixture held in the vacancies and on the surface of the positive electrode base material.

As the positive electrode base material, for example, foamed nickel can be used.

The positive electrode mixture contains nickel hydroxide particles as positive electrode active material particles, a cobalt compound as a conducting material, a binding agent and the like. The above binding agent has a function to bind the nickel hydroxide particles and the conducting material to each other and therewith bind the positive electrode mixture to the positive electrode base material. Here, as the binding material, binding materials that are typically used in nickel-hydrogen secondary batteries are suitably used.

For example, the positive electrode 6 can be produced as follows.

First, a positive electrode mixture slurry containing positive electrode active material powders composed of the positive electrode active material particles, the conducting material, water and the binding agent is prepared. The obtained positive electrode mixture slurry is filled into foamed nickel, for example, and is dried. After the drying, the foamed nickel filled with nickel hydroxide particles and the like is cut into a predetermined shape after rolling, so that an intermediate product for the positive electrode is obtained. The intermediate product for the positive electrode has an oblong shape as a whole. Then, a predetermined edge portion that is in the intermediate product for the positive electrode and where the positive electrode connection edge portion 32 is to be formed is put into a state where the positive electrode base material is uncovered, by the removal of the positive electrode mixture. Next, the edge portion where the positive electrode mixture has been removed becomes the positive electrode connection edge portion 32 by the compression in the thickness direction of the intermediate product for the positive electrode. By such a compression, the positive electrode base material is put into a dense state, and therefore, the positive electrode connection edge portion 32 is put into a state where the welding is easy. Thus, the positive electrode 6 having the positive electrode connection edge portion 32 is obtained. Here, the removal method for the positive electrode mixture is not particularly limited, and for example, the removal by giving ultrasonic vibration is suitably performed. The region other than the positive electrode connection edge portion 32 is still in a state where the positive electrode mixture is filled.

Next, as the separator 10, for example, a non-woven fabric made of polyamide fiber to which a hydrophilic functional group is added, or a non-woven fabric made of polyolefin fiber such as polyethylene fiber or polypropylene fiber to which a hydrophilic functional group is added can be used.

The positive electrode 6 and negative electrode 8 produced as described above are spirally wound while the above separator 10 is interposed, and thereby, the electrode group 4 is formed. Specifically, at the time of the winding, the positive electrode 6 and the negative electrode 8 are disposed so as to slightly deviate from each other in a direction along the axis line of the electrode group 4, and the separator 10 having a predetermined size is disposed at a predetermined position between the positive electrode 6 and the negative electrode 8. Then, in this state, the winding is performed. As a result, the columnar electrode group 4 is obtained. In the mode of the obtained electrode group 4, on one end side of the electrode group 4, the positive electrode connection edge portion 32 of the positive electrode 6 protrudes relative to the negative electrode 8 that is adjacent across the separator 10, and on the other end side of the electrode group 4, the negative electrode connection edge portion of the negative electrode 8 protrudes relative to the positive electrode 6 that is adjacent across the separator 10.

The electrode group 4 is formed by winding the above positive electrode 6, negative electrode 8 and separator 10 around a winding core having predetermined outer diameter. After the winding, the winding core is pulled out, and therefore, a through-hole 9 is formed at the center of the electrode group 4.

In the above-described electrode group 4, the positive electrode current collector 28 is connected with one end side, and the negative electrode current collector is connected with the other end side.

The negative electrode current collector is not particularly limited, and for example, it is preferable to use a disc-shaped metal plate that is conventionally used. The prepared negative electrode current collector is welded to the negative electrode connection edge portion on the other end side of the electrode group 4.

Next, the positive electrode current collector 28 will be described.

The positive electrode current collector 28 is a plate-like body composed of a conductive material. The shape in planar view is not particularly limited, and an arbitrary shape such as a disc shape or a polygonal shape can be employed. The size of the positive electrode current collector 28 is set to a size that is smaller than the outer diameter of the electrode group 4 and that allows the covering of the positive electrode connection edge portion 32 of the positive electrode 6, which protrudes from one end side of the electrode group 4.

Figure 2:
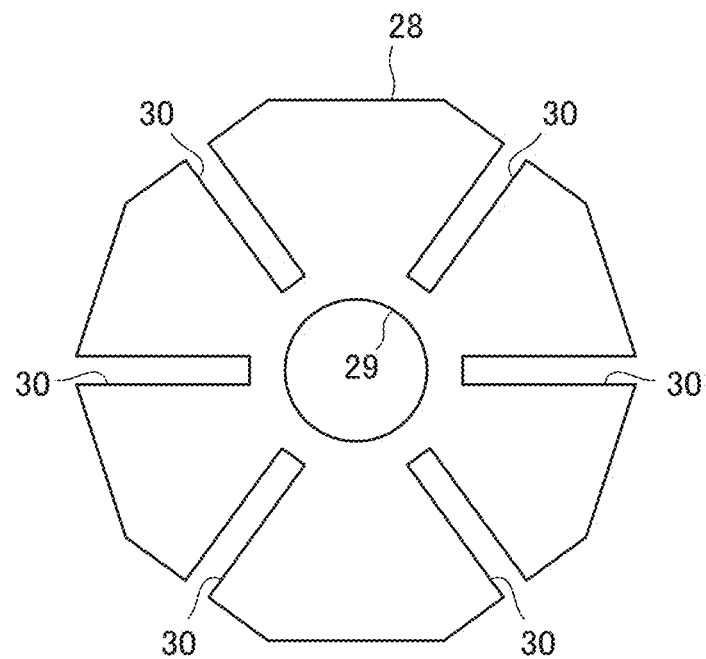
FIG. 2 is a plan view showing a positive electrode current collector in the first embodiment.

In the embodiment, as shown in FIG. 2, a plate member having a decagonal shape in planar view is used. Specifically, the positive electrode current collector 28 is a thin plate made of a Ni-plated steel and having a decagonal shape as a whole, and includes a circular central through-hole 29 at the center and six slits 30 radially extending so as to surround the central through-hole 29. It is preferable to form the slits 30 by punching, and produce projections (burrs) extending downward (to the electrode group 4 side) at edge portions of the slits 30.

In the battery 1, as shown in FIG. 1, a current collecting lead 34 is interposed between the positive electrode current collector 28 and the sealing body 14, and the current collecting lead 34 electrically connects the positive electrode current collector 28 connected with the positive electrode 6 of the electrode group 4 and the sealing body 14 including the positive electrode terminal 22.

Figure 3:
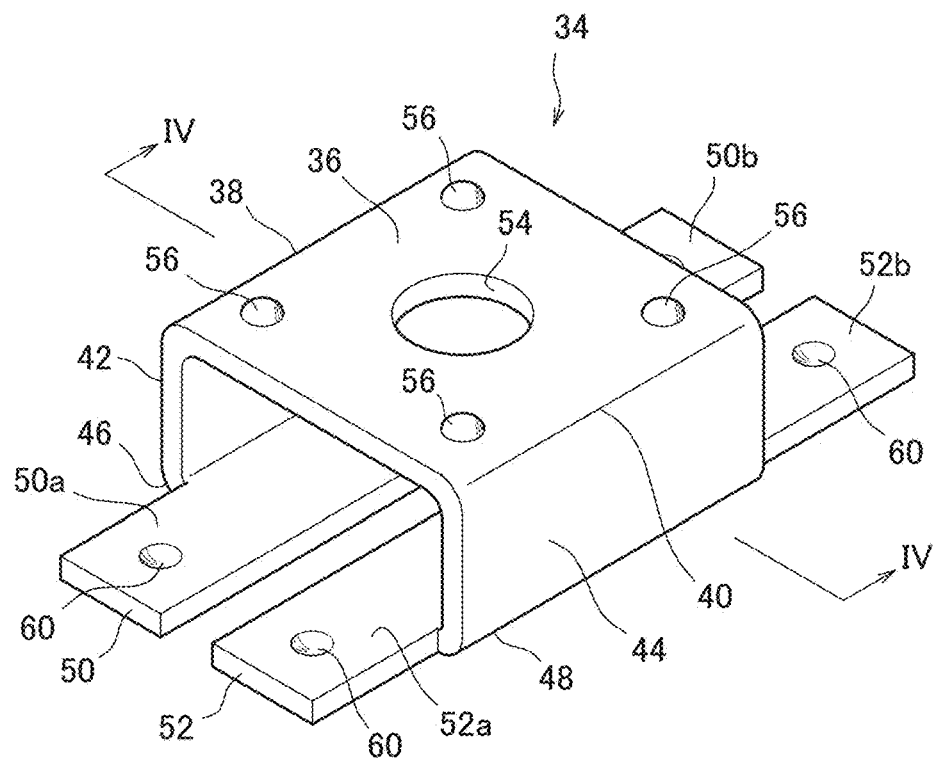
FIG. 3 is a perspective view showing a positive current collecting lead in the first embodiment.

For example, the current collecting lead 34, as shown in FIG. 3, includes a rectangular top wall portion (top wall) 36 that is connected with the sealing body 14, a pair of side wall portions (side walls) 42, 44 that extend from predetermined side edges 38, 40 of the top wall portion 36 and that face each other, and leg portions (bottom wall) 50, 52 that extend from edges 46, 48 of the side wall portions 42, 44 on the opposite side of the top wall portion 36 and that face the top wall portion 36. The leg portions (bottom wall) 50, 52 are connected with the positive electrode current collector 28.

On the top wall portion 36, a circular through-hole 54 is provided at the center. The through-hole 54 is communicated with the central through-hole 19 of the lid plate 16 when the current collecting lead 34 is connected with the sealing body 14. Further, four projection portions 56 that are welding points are provided around the through-hole 54.

Figure 4:
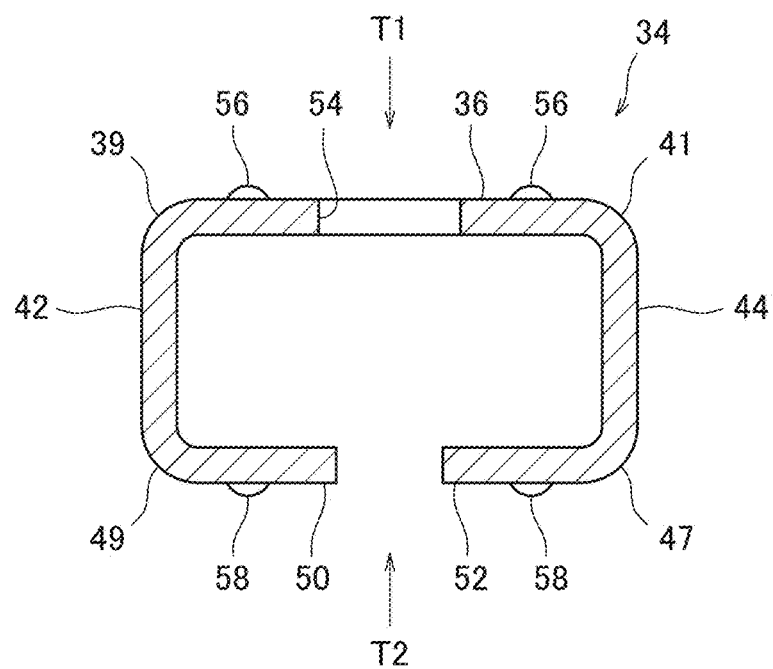
FIG. 4 is a cross-sectional view taken along line IV-IV in FIG. 3.

As is obvious from FIG. 4 showing a cross-section of the current collecting lead 34, the current collecting lead 34 has a first corner portion 39 formed by the side wall portion 42 and the top wall portion 36, a second corner portion 41 formed by the top wall portion 36 and the side wall portion 44, a third corner portion 47 formed by the side wall portion 44 and the leg portion 52, and a fourth corner portion 49 formed by the leg portion 50 and the side wall portion 42. The first to fourth corner portions 39, 41, 47, 49 are rounded corners having a curved shape.

In the case where the first to fourth corner portions 39, 41, 47, 49 are rounded corners in this way, the current collecting lead 34 easily deforms in the direction of the compression when a load acts in the direction of an arrow T1 and an arrow T2 in FIG. 4.

As shown in FIG. 3, the leg portions 50, 52 include extending portions 50a, 50b, 52a, 52b that extend in the direction along the longitudinal direction of the side wall portions 42, 44. The extending portions 50a, 50b, 52a, 52b extend outside of regions of the leg portions (bottom wall) 50, 52 that face the top wall portion 36. Therefore, the extending portions 50a, 50b, 52a, 52b have a function to increase the stability of the current collecting lead 34 when the current collecting lead 34 is connected with the positive electrode current collector 28. The extending portions 50a, 50b, 52a, 52b are provided with projection portions 58 that protrude toward to the side of the positive electrode current collector 28 (see FIG. 4). The projection portions 58 are also welding points.

Here, for example, the projection portions 56 and the projection portions 58 are formed by pressing. Reference numeral 60 in FIG. 3 denotes concave portions that are produced on the back sides of the projection portions 58 when the projection portions 58 are provided on the leg portions 50, 52.

For example, the current collecting lead 34 is produced as follows.

Figure 5:
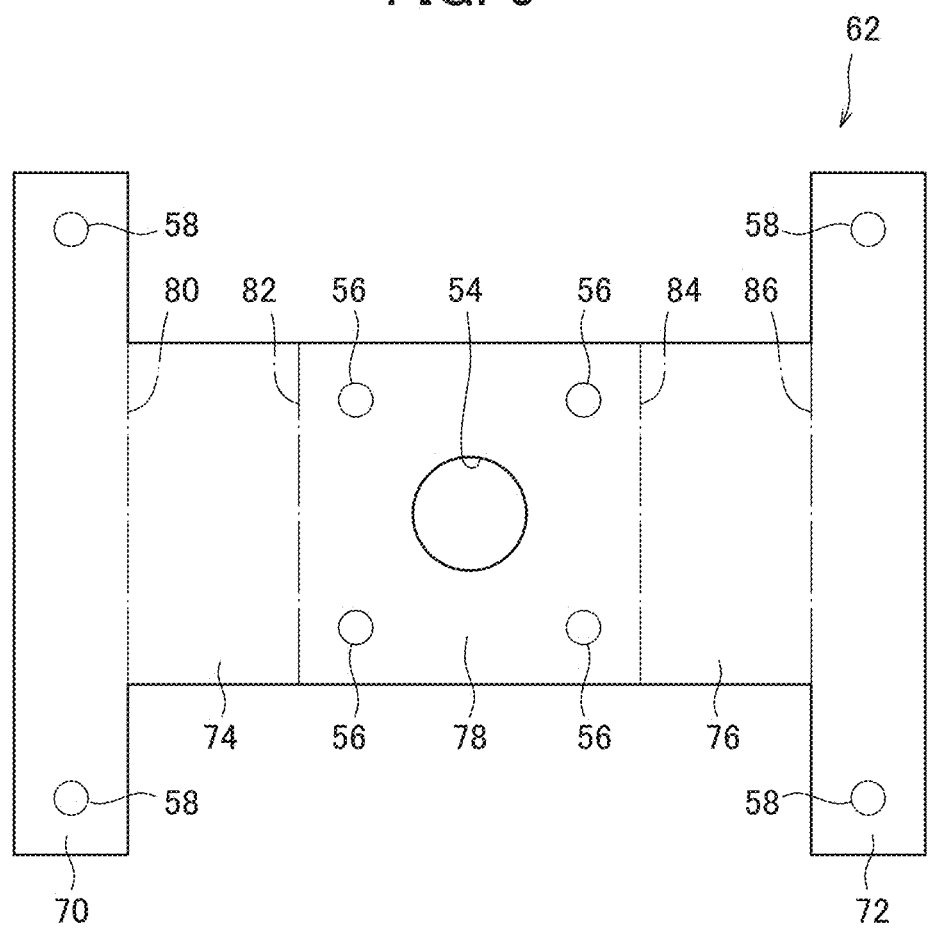
FIG. 5 is a plan view showing an intermediate product for the current collecting lead in the first embodiment.

First, by processing a thin plate made of metal, an intermediate product 62 for the current collecting lead that is composed of a thin plate having a nearly H-shape in planar view shown in FIG. 5 is prepared. The thin plate is sufficiently thicker compared to the conventional positive electrode ribbon. In the intermediate product 62, long portions positioned at both side portions are leg portion-intended regions 70, 72 where the leg portions 50, 52 are to be formed. Regions inside of the leg portion-intended regions 70, 72 are side wall portion-intended regions 74, 76 where the side wall portions 42, 44 are to be formed. Further, a region sandwiched between the side wall portion-intended region 74 and the side wall portion-intended region 76 is a top wall portion-intended region 78 where the top wall portion 36 is to be formed.

Furthermore, on the intermediate product 62, by punching, the through-hole 54 is drilled at the center of the top wall portion-intended region 78.

Next, by pressing, the projection portions 56, 58 are provided at predetermined positions around the through-hole 54 and predetermined positions of both end portions of each of the leg portion-intended regions 70, 72.

Thereafter, portions of imaginary lines 80, 82, 84, 86 are folded, and thereby, the current collecting lead 34 shown in FIG. 3 is formed.

In the embodiment, a space is provided between the leg portion 50 and the leg portion 52, and the bottom wall portion is divided into two. The present invention is not limited to this mode, and the leg portion 50 and the leg portion 52 may be coupled so as to form a single bottom wall portion in which the leg portion 50 and the leg portion 52 are united.

Next, an example of the procedure of the assembly of the battery 1 will be described.

The above electrode group 4 is prepared. Then, the negative electrode current collector is connected with the other end side of the electrode group 4, and thereafter, the electrode group 4 is placed into the outer can. Then, the resistance spot welding of the negative electrode current collector is performed to the bottom wall of the outer can.

Next, the positive electrode current collector 28 is put on the one end side of the electrode group 4, and further, the current collecting lead 34 is put on the positive electrode current collector 28. At this time, the position adjustment is performed on the basis of the slits 30 of the positive electrode current collector 28, such that the current collecting lead 34 is disposed at a predetermined position. Then, the resistance spot welding of the electrode group 4, the positive electrode current collector 28 and the current collecting lead 34 is performed. Thereby, the positive electrode connection edge portion 32 of the positive electrode 6 and the positive electrode current collector 28 are welded, and the positive electrode current collector 28 and the leg portions 50, 52 of the current collecting lead 34 are welded.

Next, a predetermined amount of alkaline electrolyte is poured into the outer can 2. The alkaline electrolyte poured into the outer can 2 is held by the electrode group 4, and most of the alkaline electrolyte is held by the separator 10. The alkaline electrolyte promotes electrochemical reactions (charge and discharge reactions) at the time of the charge and discharge between the positive electrode 6 and the negative electrode 8. As the alkaline electrolyte, it is preferable to use an alkaline electrolyte containing, as a solute, at least one kind of KOH, NaOH and LiOH.

Thereafter, the sealing body 14 is disposed in the upper end opening portion of the outer can 2, with the insulating gasket 18. At this time, the current collecting lead 34 and the sealing body 14 contacts with each other.

Thereafter, electric current is applied between the positive electrode terminal 22 and negative electrode terminal of the battery 1, under pressure, and resistance indirect spot welding is performed. Thereby, the top wall portion 36 of the current collecting lead 34 and the lid plate 16 of the sealing body 14 are welded.

Thereafter, the opening 3 of the outer can 2 is sealed by crimping the opening rim 17 of the outer can 2.

Here, the top wall portion 36 of the current collecting lead 34 is disposed such that the projection portion 56 abuts on the lid plate 16 of the sealing body 14. When the resistance indirect spot welding is performed, welding current concentrates at the projection portion 56, and a part of the projection portion 56 melts, so that the top wall portion 36 of the current collecting lead 34 and the lid plate 16 are connected.

Thus, the positive electrode 6 and the positive electrode terminal 22 are electrically connected through the positive electrode current collector 28, the current collecting lead 34 and the lid plate 16, so that the battery 1 is formed.

At the time of the above resistance spot welding and at the time of the above crimping, a compressive load acts on the battery 1 in a direction along the axis line. Therewith, a compressive load acts also on components constituting the battery 1, as exemplified by the electrode group 4, the positive electrode current collector 28 and the current collecting lead 34. Here, in the current collecting lead 34, since the first to fourth corner portions 39, 41, 47, 49 are rounded corners as described above, when the compressive load acts in a direction in which the top wall portion 36 and the leg portions 50, 52 approach each other, that is, in a direction shown by the arrow T1 and the arrow T2 in FIG. 4 (hereinafter, referred to as a compression direction), the deformation of the side wall portions 42, 44 easily occurs. That is, the current collecting lead 34 has a shape in which the deformation easily occurs. When the deformation of the current collecting lead 34 easily occurs in this way, the current collecting lead 34 preferentially deforms and suppresses the deformation of the positive electrode current collector 28, so that it is possible to inhibit the positive electrode current collector 28 from pressing the electrode group 4. As a result, it is possible to inhibit the occurrence of the internal short-circuit.

In embodiments of the present invention, for ease of the deformation of the current collecting lead 34, the first to fourth corner portions 39, 41, 47, 49 are formed as rounded corners, as described above. Here, it is thought that the degree of the ease of the deformation of the current collecting lead 34 mostly depends on the curvature radius of the rounded corner. That is, as the curvature radius of the rounded corner becomes smaller, the regions of flat surfaces on the side wall portions 42, 44 increase, and therefore, it is hard for the side wall portions 42, 44 to bend, even when the load acts in the compression direction. Conversely, as the curvature radius of the rounded corner becomes larger, the regions of the flat surfaces on the side wall portions 42, 44 decrease, and therefore, it is easy for the side wall portions 42, 44 to bend, when the load acts in the compression direction.

For evaluating preferable curvature radii of the rounded corner, the inventor has performed the following study.

First, the amount by which the sealing body is pushed into the outer can 2 during a series of operations such as the resistance spot welding and the crimping, that is, the descent amount of the sealing body is referred to as "descent amount A", the thickness of the thin metal plate composing the current collecting lead 34 is referred to as "lead thickness B", the thickness of the thin metal plate composing the positive electrode current collector 28 is referred to as "current collector thickness C", and the curvature radius of the rounded corner of the current collecting lead 34 is referred to as "curvature radius D".

Figure 6:
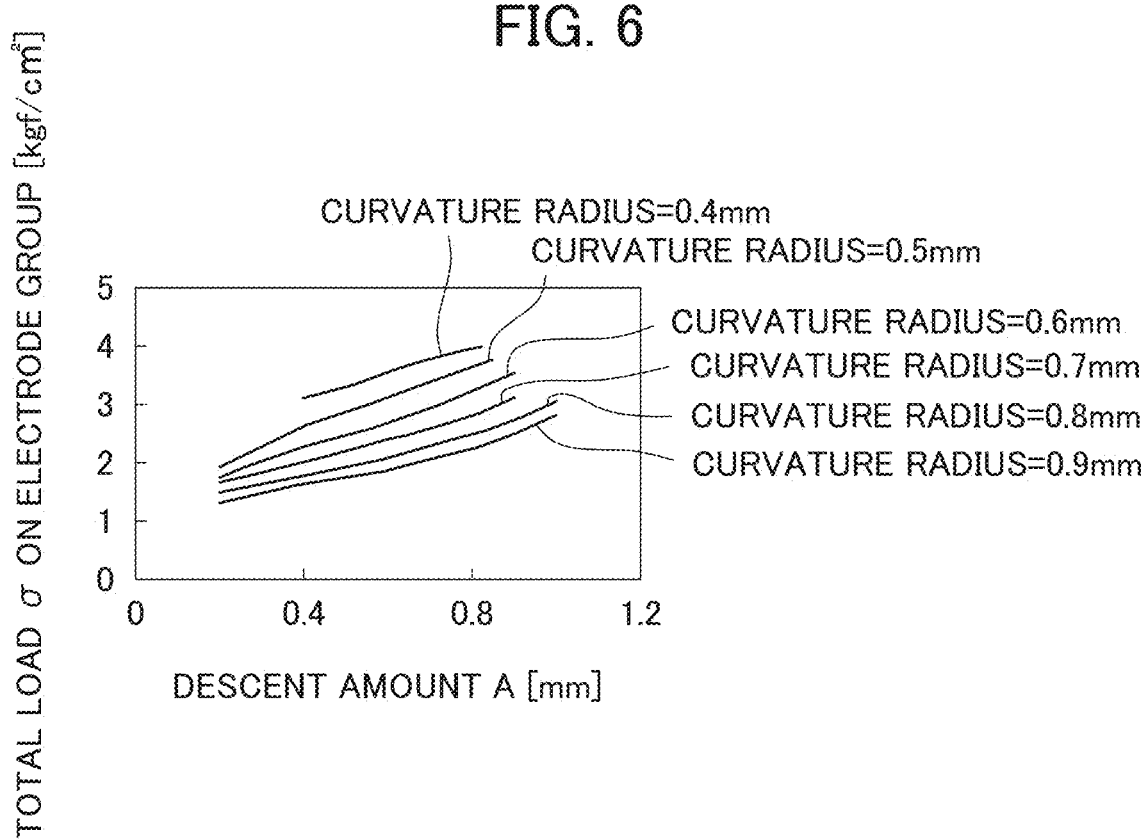
FIG. 6 is a graph showing a relation between a descent amount A and a total load σ on an electrode group.

A relation between the descent amount A [mm] and a total load σ [kgf/cm$^2$] on the electrode group when the curvature radius of the rounded corner of the current collecting lead is changed from 0.4 mm to 0.9 mm in units of 0.1 mm was evaluated. The result is shown in FIG. 6. From FIG. 6, it is found that the descent amount A and the total load σ on the electrode group have a proportional relation.

Figure 7:
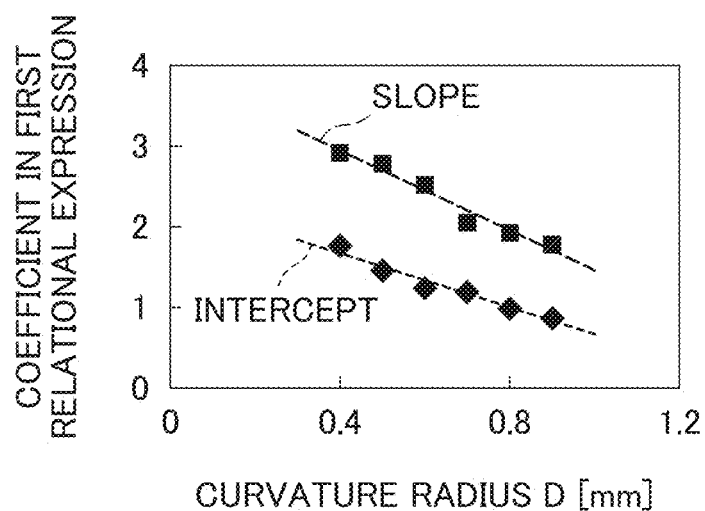
FIG. 7 is a graph showing a relation between a coefficient in a first relational expression and a curvature radius D.

FIG. 7 shows a relation of a slope and an intercept when a load curve obtained at the time of plotting the relation between the descent amount A [mm] and the total load σ [kgf/cm$^2$] on the electrode group at the curvature radius D [mm] is approximated by a quadratic. Here, a relational expression of A, D and σ is shown below, as a first relational expression (I).

$$\sigma = (-2.456D + 3.9243)A - 1.673D + 2.3413 \quad (I)$$

Here, in the first relational expression (I), the part of −2.456D+3.9243 indicates an approximate expression of the slope, and the part of −1.673D+2.3413 indicates an approximate expression of the intercept. In FIG. 7, the ordinate indicates a coefficient in the first relational expression, and the abscissa indicates the curvature radius D.

From FIG. 7, it is found that the increase in the load is suppressed when the curvature radius D increases.

Figure 8:
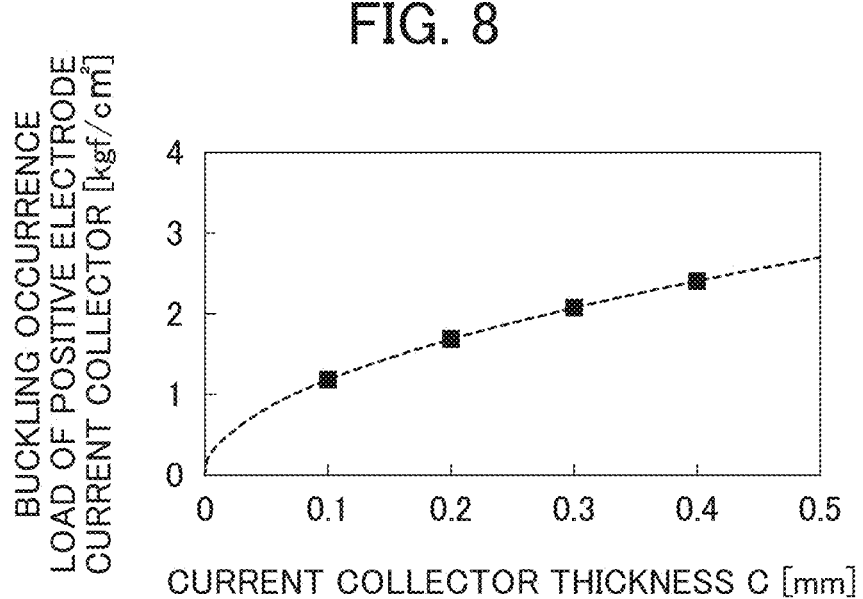
FIG. 8 is a graph showing a relation between a current collector thickness C and a buckling occurrence load of the positive electrode current collector.

A relation between the current collector thickness C [mm] and a buckling occurrence load [kgf/cm$^2$] of the positive electrode current collector is shown in FIG. 8. From FIG. 8, it is found that the limit of the buckling occurrence load rises when the current collector thickness C increases.

Figure 9:
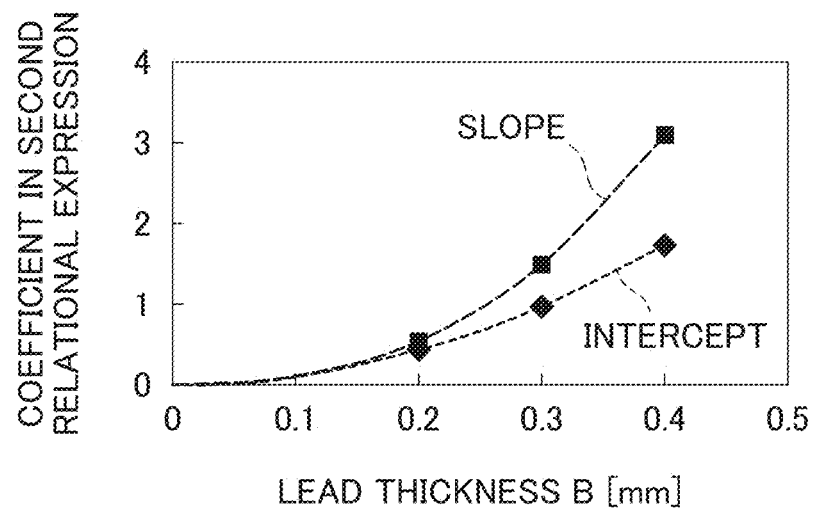
FIG. 9 is a graph showing a relation between a coefficient in a second relational expression and a lead thickness B.

FIG. 9 shows a relation of a slope and an intercept when a load curve obtained at the time of plotting the relation between the descent amount A [mm] and the total load σ [kgf/cm$^2$] on the electrode group at the lead thickness B [mm] is approximated by an expression with the 2.5 power of the thickness in accordance with the second moment of area. Here, a correction term (relational expression) in which B is added to the relational expression of A, D and σ is shown below, as a second relational expression (II).

$$\sigma = (-49.82D + 79.61)B^{2.5}A + (-18.59D + 26.01)B^{2.5} \quad (II)$$

Here, in the second relational expression (II), the part of (−49.82D+79.61)B$^{2.5}$ indicates an approximate expression of the slope, and the part of (−18.59D+26.01)B$^{2.5}$ indicates an approximate expression of the intercept. In FIG. 9, the ordinate indicates a coefficient in the second relational expression, and the abscissa indicates the lead thickness B.

From FIG. 9, it is found that the load increases when the lead thickness B increases.

The mathematical expression expressing the relation of the above parameters: the descent amount A, the lead thickness B, the current collector thickness C and the curvature radius D can be shown as the following expression (III).

[Expression 1]

$$\frac{\sqrt{C}}{B^{2.5}} = (-13.128A - 4.8986)D + 20.978A + 6.8538 \quad (III)$$

By using the expression (III), for example, the minimum necessary curvature radius D can be evaluated.

Further, when the lead thickness B is set from the limit of the thickness that provides the effect of a good reduction in the internal resistance of the battery and the limit of the descent amount A is set from the fabrication tolerance, it is possible to evaluate a combination of the curvature radius D and the current collector thickness C that makes it possible to suppress the deformation (buckling) of the positive electrode current collector, by using the expression (III).

In recent years, the size reduction of various devices has been promoted, and small-size devices have been also required to discharge electricity at a high rate. In such a situation, small-size batteries to be used in small-size devices, as exemplified by an AA type (corresponding to R6 type, or Tan 3 type (which is the term in Japan)) battery and an AAA type (corresponding to R03 type, or Tan 4 type (which is the term in Japan)) battery, have been also required to discharge electricity at a higher rate.

However, in the small-size batteries, it is necessary to reduce the size of the current collecting lead, compared to large-size batteries, as exemplified by a D type (corresponding to R20 type, or Tan 1 type (which is the term in Japan)) battery and a C type (corresponding to R14 type, or Tan 2 type (which is the term in Japan)) battery. The flexibility of the current collecting lead decreases due to the size reduction of the current collecting lead. Therefore, when the compressive load is applied in the direction of the axis line of the battery, the current collecting lead does not sufficiently deform, and the load acts directly on the current collector. As a result, the positive electrode current collector deforms, and presses the electrode group, so that the short-circuit occurs more easily. Further, in the small-size batteries, the winding number of the electrode group is small, and therefore, the strength of the electrode group itself in the axis line direction is low. Therefore, in a small-size battery in which a simply size-reduced current collecting lead is used for obtaining a good high-rate discharge characteristic, the deformation of the positive electrode current collector causes the short-circuit more easily, compared to large-size batteries.

Against such a situation, since the corner portions of the current collecting lead are rounded corners, embodiments of the present invention preferentially deform the current collecting lead, and suppress the deformation of the positive electrode current collector, so that it is possible to avoid the press to the electrode group. Therefore, embodiments of the present invention are effective, particularly, in suppressing the occurrence of the short-circuit of a small-size battery having a good high-rate discharge characteristic, specifically, a battery having a diameter of 18 mm or less.

A current collecting component formed by the combination of the positive electrode current collector 28 and the current collecting lead 34 is provided in a slight space between the sealing body 14 and the electrode group 4. Particularly, the space between the sealing body 14 and the electrode group 4 in the above small-size battery is smaller compared to large-size batteries. Therefore, in the small-size battery, it is preferable that the total component height of the current collecting component be as small as possible. Here, particularly, when the above total component height of the current collecting component is (2D+C), the following expression (IV) is exemplified as a calculation expression that is obtained in consideration of combinations to further reduce the value of (2D+C). Based on the expression (IV), it is possible to evaluate Dmin that is the minimum necessary value of the curvature radius D.

[Expression 2]

$$D\min = \frac{-1}{(\alpha A + \beta)^2 B^5} - \frac{\gamma A + \delta}{\alpha A + \beta} \quad \text{(IV)}$$

The procedure for obtaining the expression (IV) will be described below. First, the expression (III) is deformed as follows, and the resulting expression is referred to as a basic expression (V).

$$C^{0.5} = ((-13.128A - 4.8986)D + 20.978A + 6.8538)B^{2.5} \quad \text{(V)}$$

In the basic expression (V), −13.128 is replaced with $\alpha$, −4.8986 is replaced with $\beta$, 20.978 is replaced with $\gamma$, and 6.8538 is replaced with $\delta$. As a result, the basic expression (V) becomes the following expression (VI).

$$C^{0.5} = ((\alpha A + \beta)D + \gamma A + \delta)B^{2.5} \quad \text{(VI)}$$

Furthermore, by adopting $\alpha A + \beta = n_{A1}$ and $\gamma A + \delta = n_{A2}$, the expression (VI) becomes the following expression (VII).

$$C^{0.5} = (n_{A1}D + n_{A2})B^{2.5} \quad \text{(VII)}$$

Here, $n_{A1}$ and $n_{A2}$ are linear-proportional to A.

Assuming that the curvature radius D of the corner portions (the first corner portion 39 and the second corner portion 41) positioned on the side of the top wall portion 36 and the curvature radius D of the corner portions (the third corner portion 47 and the fourth corner portion 49) positioned on the side of the leg portions 50, 52 are maximized in the current collecting lead 34, the total height of the current collecting component to be formed by the combination of the positive electrode current collector 28 and the current collecting lead 34 is 2D+C. When the expression (VII) is plugged into the expression of 2D+C, the following expression (VIII) is obtained.

$$2D + C = 2D + (n_{A1}D + n_{A2})^2 B^5 \quad \text{(VIII)}$$

Next, by arranging the expression (VIII), the following expression (IX) is obtained.

[Expression 3]

$$\begin{aligned}
2D + C &= \frac{2D}{B^5} + (n_{A1}D + n_{A2})^2 \\
&= n_{A1}^2 D^2 + 2n_{A1}n_{A2}D + \frac{2D}{B^5} + n_{A2}^2 \\
&= n_{A1}^2 D^2 + 2\left(n_{A1}n_{A2} + \frac{1}{B^5}\right)D + n_{A2}^2
\end{aligned} \quad \text{(IX)}$$

Then, from the expression (IX), Dmin that is the minimum necessary value of the curvature radius D is evaluated by completing the square or by the quadratic formula, as follows, so that the above expression (IV) is obtained.

[Expression 4]

$$D\min = \frac{-1}{n_{A1}^2 B^5} - \frac{n_{A2}}{n_{A1}} = \frac{-1}{(\alpha A + \beta)^2 B^5} - \frac{\gamma A + \delta}{\alpha A + \beta} \quad \text{(IV)}$$

Here, when the expression is solved for Dmin, C can be eliminated. However, the expression (IV) is a relational expression that holds when C has been set, and therefore, the setting of C is a precondition. In the embodiment, it is preferable that C satisfy 0.25 mm<C≤0.40 mm.

Because of the limit of the thickness that provides the effect of a good reduction in the internal resistance of the battery, B>0.25 mm is adopted.

Calculation examples using specific numerical values will be shown below.

(1) Calculation Example 1

Figure 10:
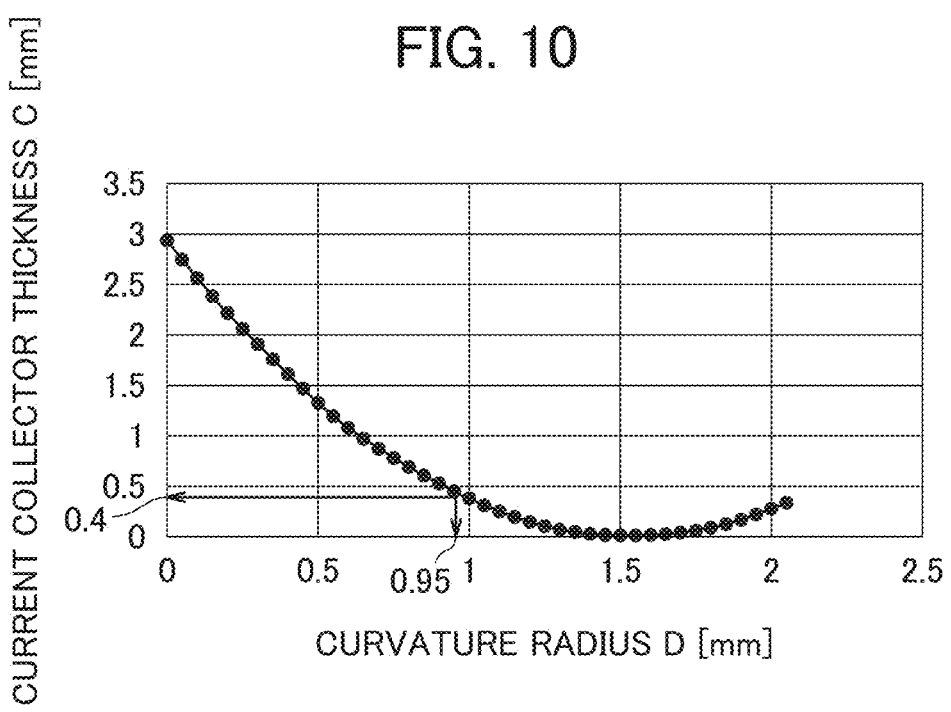
FIG. 10 is a graph showing a relation between the curvature radius D and the current collector thickness C in a calculation example 1.

In the case where the lead thickness B is 0.35 mm and the limit of the descent amount A is 0.80 mm, the current collector thickness C is calculated from the descent amount A, the lead thickness B and the curvature radius D, using the expression (III). FIG. 10 shows a graph of the result. FIG. 10 reveals that as the curvature radius D is increased, the load decreases and the current collector thickness C can be reduced. For example, it is found that the curvature radius D needs to be 0.95 mm when the current collector thickness C is 0.4 mm. When the limit of the descent amount A itself decreases, it is possible to reduce the curvature radius D or the current collector thickness C, by an amount corresponding to the decreasing amount. For example, D=0.84 mm holds in the case of A=0.6 mm, B=0.35 mm and C=0.4 mm. Further, C=0.28 mm holds in the case of A=0.6 mm, B=0.35 mm and D=0.95 mm.

Figure 11:
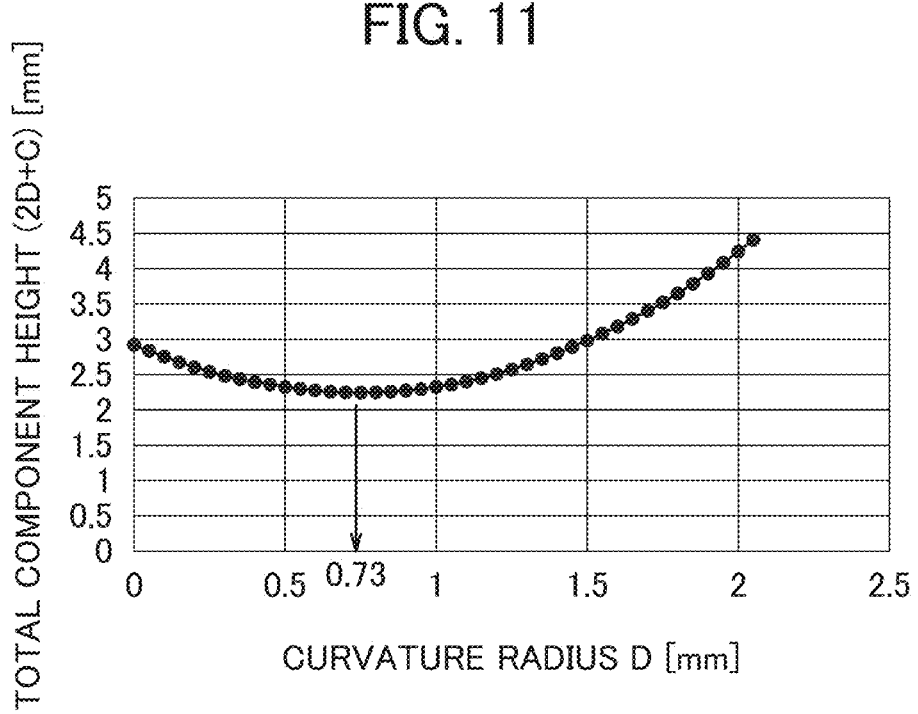
FIG. 11 is a graph showing a relation between the curvature radius D and a total component height (2D+C) in the calculation example 1.

As shown in the example of the graph in FIG. 10, there are an infinite number of combinations of the current collector thickness C and the curvature radius D with respect to the limit of the descent amount A and the lead thickness B. However, when the total component height is (2D+C) and the calculation is performed using the expression (IV) in terms of the combination that minimizes the value of (2D+C), a result shown by a graph in FIG. 11 is obtained. From the graph, the curvature radius Dmin when the value of (2D+C) is minimized is Dmin=0.73 mm. The current collector thickness C in this case is 0.8 mm.

(2) Calculation Example 2

Figure 12:
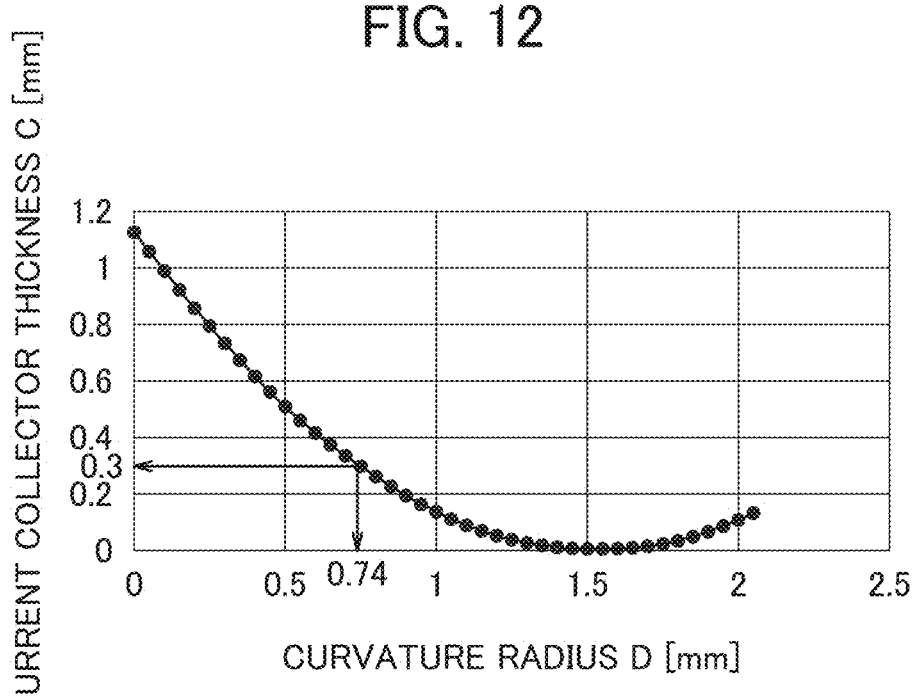
FIG. 12 is a graph showing a relation between the curvature radius D and the current collector thickness C in a calculation example 2.

In the case where the lead thickness B is 0.30 mm and the limit of the descent amount A is 0.70 mm, the current collector thickness C is calculated from the descent amount A, the lead thickness B and the curvature radius D, using the expression (III). FIG. 12 shows a graph of the result. FIG. 12 reveals that as the curvature radius D is increased, the load decreases and the current collector thickness C can be reduced. For example, it is found that the curvature radius D needs to be 0.74 mm when the current collector thickness C is 0.3 mm. Since the limit of the descent amount A and the lead thickness B are decreased compared to the case of the calculation example 1, it is possible to reduce the curvature radius D or the current collector thickness C compared to the case of the calculation example 1.

Figure 13:
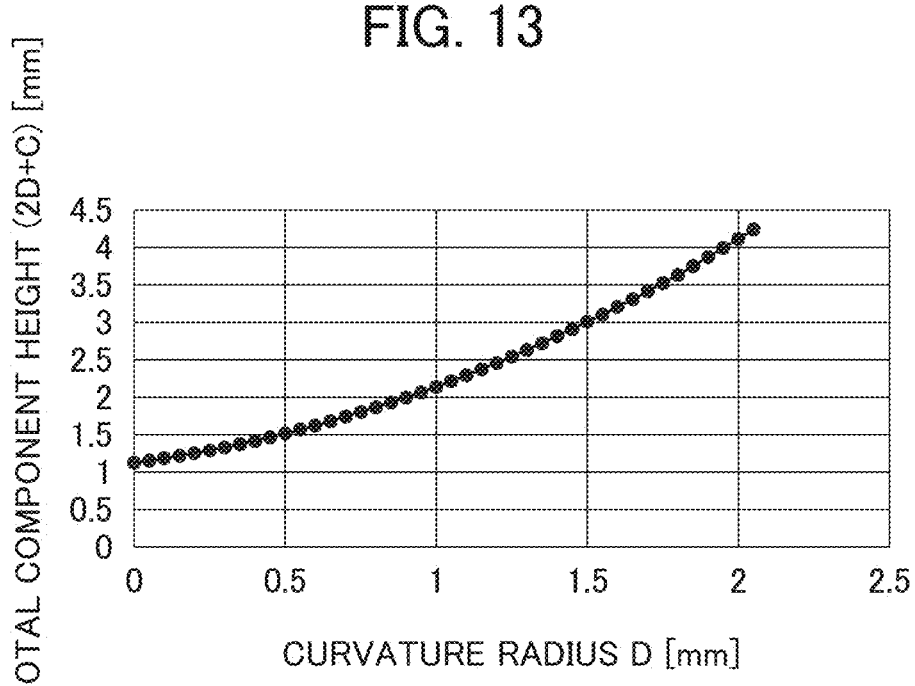
FIG. 13 is a graph showing a relation between the curvature radius D and the total component height (2D+C) in a calculation example 2.

When Dmin is calculated using the expression (IV) similarly to the case of the calculation example 1, a result shown by a graph in FIG. 13 is obtained. In this case, Dmin is −0.54 mm, which is a negative value. That is, the result shows a behavior in a condition with no optimum value. As shown by the graph in FIG. 12, it is necessary to increase the current collector thickness C as the curvature radius D becomes smaller. Nevertheless, in the obtained calculation result, the total component height (2D+C) is smaller as a whole in the case of a combination in which the curvature radius D is as small as possible and the current collector thickness C is as thick as possible.

In embodiments of the present invention, the curvature radius of the current collecting lead is defined as the portion of an outer arc of the corner portion of the current collecting lead in section view.

In the above assembly procedure for the battery 1, the electrode group 4 is placed into the outer can 2, and then, the positive electrode current collector 28 is welded. However, the present invention is not limited to this mode, and the positive electrode current collector 28 may be welded to the electrode group 4 in advance.

Second Embodiment

In the following, an alkaline secondary battery including a current collecting lead according to a second embodiment of the present invention will be described with reference to the drawings.

A 4/3 FA-size cylindrical nickel-hydrogen secondary battery (hereinafter, referred to as a battery 101) shown in FIG. 15 will be described as an example of the second embodiment to which the present invention is applied.

The battery 101 includes an outer can 102 having a bottomed cylindrical shape in which an upper end is opened, the outer can 102 has electric conductivity, and a bottom wall thereof functions as a negative electrode terminal. In the outer can 102, an electrode group 104 is placed together with a predetermined amount of alkaline electrolyte (not illustrated).

Figure 15:
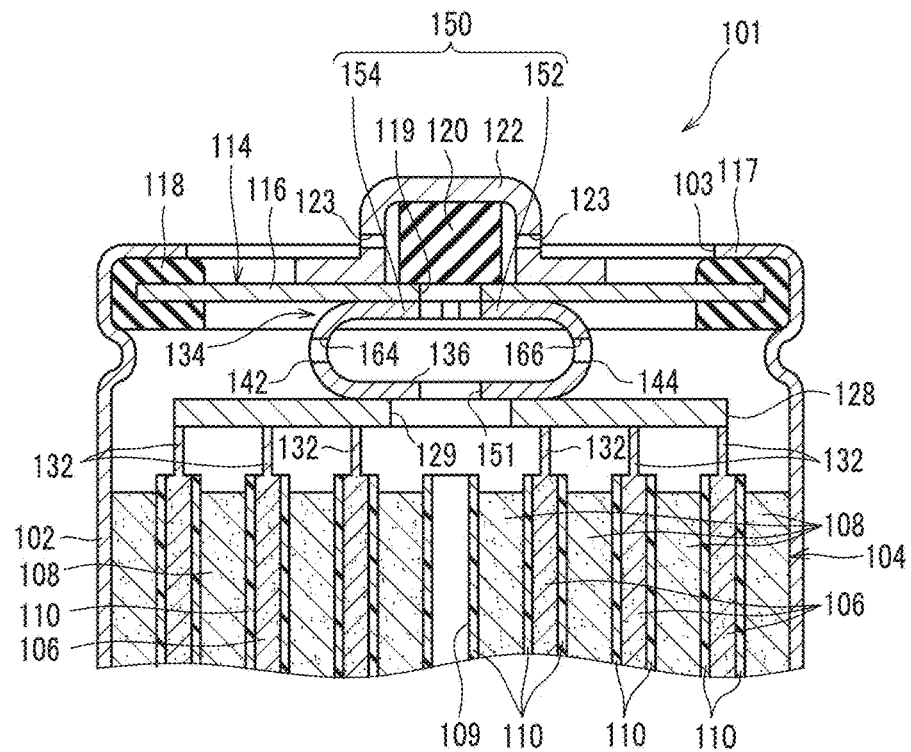
FIG. 15 is a partial cross-sectional view showing a second embodiment of the cylindrical nickel-hydrogen secondary battery according to the present invention.

As shown in FIG. 15, an opening 103 of the outer can 102 is closed by a sealing body 114. The sealing body 114 includes a disc-shaped lid plate 116 having electric conductivity, and a valve body 120 and a positive electrode terminal 122 that are provided on the outer surface of the lid plate 116. At an outer peripheral portion of the lid plate 116, a ring-shaped insulating gasket 118 is disposed so as to surround the lid plate 116. The insulating gasket 118 and the lid plate 116 are fixed to an opening rim 117 of the outer can 102, by crimping the opening rim 117 of the outer can 102. That is, the lid plate 116 and the insulating gasket 118 seal the opening 103 of the outer can 102, in cooperation with each other. Here, the lid plate 116 has a central through-hole 119 at the center, and the valve body 120 made of rubber is disposed on the outer surface of the lid plate 116, so as to close the central through-hole 119. Furthermore, the cylindrical positive electrode terminal 122 with a flange is electrically connected with the outer surface of the lid plate 116, so as to cover the valve body 120. The positive electrode terminal 122 depresses the valve body 120 toward the lid plate 116. Further, the positive electrode terminal 122 has a venting hole 123 on the side surface.

In normal times, the central through-hole 119 is closed by the valve body 120, in an airtight manner. Meanwhile, when gas is generated in the interior of the outer can 102 and the pressure of the gas is increased, the valve body 120 is compressed by the pressure of the gas so that the central through-hole 119 is opened. As a result, the gas is released from the interior of the outer can 102 to the exterior through the central through-hole 119 and the venting hole 123 of the positive electrode terminal 122. That is, the central through-hole 119, the valve body 120 and the venting hole 123 of the positive electrode terminal 122 form a safety valve for the battery 101.

The electrode group 104 includes a positive electrode 106, a negative electrode 108 and a separator 110 that have belt-like shapes respectively, and they are spirally wound while the separator 110 is interposed between the positive electrode 106 and the negative electrode 108. That is, the positive electrode 106 and the negative electrode 108 are overlapped on each other, with the separator 110 therebetween. The electrode group 104 formed in this way has a columnar shape as a whole.

In the electrode group 104, from one end face, an edge portion of the positive electrode 106 is spirally exposed, and from the other end face, an edge portion of the negative electrode 108 is spirally exposed. Here, the exposed edge portion of the positive electrode 106 is referred to as a positive electrode connection edge portion 132, and the exposed edge portion of the negative electrode 108 is referred to as a negative electrode connection edge portion (not illustrated). To the exposed positive electrode connection edge portion 132 and negative electrode connection edge portion, a positive electrode current collector 128 and a negative electrode current collector (not illustrated), which will be described later, are welded, respectively.

The negative electrode 108 includes a conductive negative electrode core body having a belt-like shape, and in the negative electrode core body, a negative electrode mixture is held.

The negative electrode core body is a belt-like metal member, and many through-holes (not illustrated) passing in the thickness direction are provided. As the negative electrode core body, for example, a punching metal sheet can be used.

The negative electrode mixture is filled into the through-holes of the negative electrode core body, and in addition, is held as layers on both surfaces of the negative electrode core body.

The negative electrode mixture contains particles of a hydrogen storage alloy, a conducting material, a binding agent and the like. Here, the hydrogen storage alloy is an alloy capable of storing and releasing hydrogen that is a negative electrode active material, and hydrogen storage alloys that are typically used in nickel-hydrogen secondary batteries are suitably used. The above binding agent has a function to bind the particles of the hydrogen storage alloy and the conducting material to each other and therewith bind the negative electrode mixture to the negative electrode core body. Here, as the conducting material and the binding agent, materials that are typically used in nickel-hydrogen secondary batteries are suitably used.

For example, the negative electrode 108 can be produced as follows.

First, hydrogen storage alloy powders that are aggregates of the hydrogen storage alloy particles, the conducting material, the binding agent and water are mixed and kneaded, and a paste of the negative electrode mixture is prepared. The obtained paste of the negative electrode mixture is applied on the negative electrode core body, and is dried. Thereafter, for the negative electrode core body to which the negative electrode mixture containing the hydrogen storage alloy particles and the like is attached, rolling and cutting are performed. Thereby, the negative electrode 108 is obtained.

Next, the positive electrode 106 will be described.

The positive electrode 106 contains a positive electrode base material having electric conductivity and a positive electrode mixture held by the positive electrode base material. Specifically, the positive electrode base material has a porous structure with many vacancies, and the positive electrode mixture is held in the vacancies and on the surface of the positive electrode base material.

As the positive electrode base material, for example, foamed nickel can be used.

The positive electrode mixture contains nickel hydroxide particles as positive electrode active material particles, a cobalt compound as a conducting material, a binding agent and the like. The above binding agent has a function to bind the nickel hydroxide particles and the conducting material to each other and therewith bind the nickel hydroxide particles and the conducting material to the positive electrode base material. Here, as the binding material, binding materials that are typically used in nickel-hydrogen secondary batteries are suitably used.

For example, the positive electrode 106 can be produced as follows.

First, a positive electrode mixture slurry containing positive electrode active material powders that are aggregates of the positive electrode active material particles (nickel hydroxide particles), the conducting material, water and the binding agent is prepared. The obtained positive electrode mixture slurry is filled into foamed nickel, for example, and is dried. Thereafter, for the foamed nickel filled with nickel hydroxide particles and the like, rolling and cutting are performed. Thereby, an intermediate product for the positive electrode is obtained. The intermediate product for the positive electrode has an oblong shape as a whole. Then, a predetermined edge portion that is in the intermediate product for the positive electrode and where the positive electrode connection edge portion 132 is to be formed is put into a state where the positive electrode base material is uncovered, by the removal of the positive electrode mixture. Next, the edge portion where the positive electrode mixture has been removed becomes the positive electrode connection edge portion 132 by the compression in the thickness direction of the intermediate product for the positive electrode. By such a compression, the positive electrode base material is put into a dense state, and therefore, the positive electrode connection edge portion 132 is put into a state where the welding is easy. In some cases, a thin plate made of a Ni-plated steel is connected with the positive electrode connection edge portion 132 by resistance welding, and thereby, the welding becomes further easy. Thus, the positive electrode 106 having the positive electrode connection edge portion 132 is obtained. Here, the removal method for the positive electrode mixture is not particularly limited, and for example, a method of the removal by giving ultrasonic vibration is suitably used. The region other than the positive electrode connection edge portion 132 is still in a state where the positive electrode mixture is filled.

Next, as the separator 110, for example, a non-woven fabric made of polyamide fiber to which a hydrophilic functional group is added, or a non-woven fabric made of polyolefin fiber such as polyethylene fiber or polypropylene fiber to which a hydrophilic functional group is added can be used.

The positive electrode 106 and negative electrode 108 produced as described above are spirally wound while the above separator 110 is interposed, and thereby, the electrode group 104 is formed. Specifically, at the time of the winding, the positive electrode 106 and the negative electrode 108 are disposed so as to slightly deviate from each other in a direction along the axis line of the electrode group 104, and the separator 110 having a predetermined size is disposed at a predetermined position between the positive electrode 106 and the negative electrode 108. Then, in this state, the winding is performed. As a result, the columnar electrode group 104 is obtained. In the mode of the obtained electrode group 104, on one end side of the electrode group 104, the positive electrode connection edge portion 132 of the positive electrode 106 protrudes relative to the negative electrode 108 that is adjacent across the separator 110, and on the other end side of the electrode group 104, the negative electrode connection edge portion of the negative electrode 108 protrudes relative to the positive electrode 106 that is adjacent across the separator 110.

The electrode group 104 is formed by winding the above positive electrode 106, negative electrode 108 and separator 110 around a winding core having predetermined outer diameter. After the winding, the winding core is pulled out, and therefore, a through-hole 109 is formed at the center of the electrode group 104.

In the above-described electrode group 104, the positive electrode current collector 128 is connected with one end side, and the negative electrode current collector is connected with the other end side.

The negative electrode current collector is not particularly limited, and for example, it is preferable to use a disc-shaped metal plate that is conventionally used. The prepared negative electrode current collector is welded to the negative electrode connection edge portion on the other end side of the electrode group 104.

Next, the positive electrode current collector 128 will be described.

The positive electrode current collector 128 is a plate-like body formed of a conductive material. The shape in planar view is not particularly limited, and an arbitrary shape such as a disc shape or a polygonal shape can be employed. The size of the positive electrode current collector 128 is set to a size that is smaller than the outer diameter of the electrode group 104 and that enables to cover the positive electrode connection edge portion 132 of the positive electrode 106, which protrudes from one end side of the electrode group 104.

Figure 16:
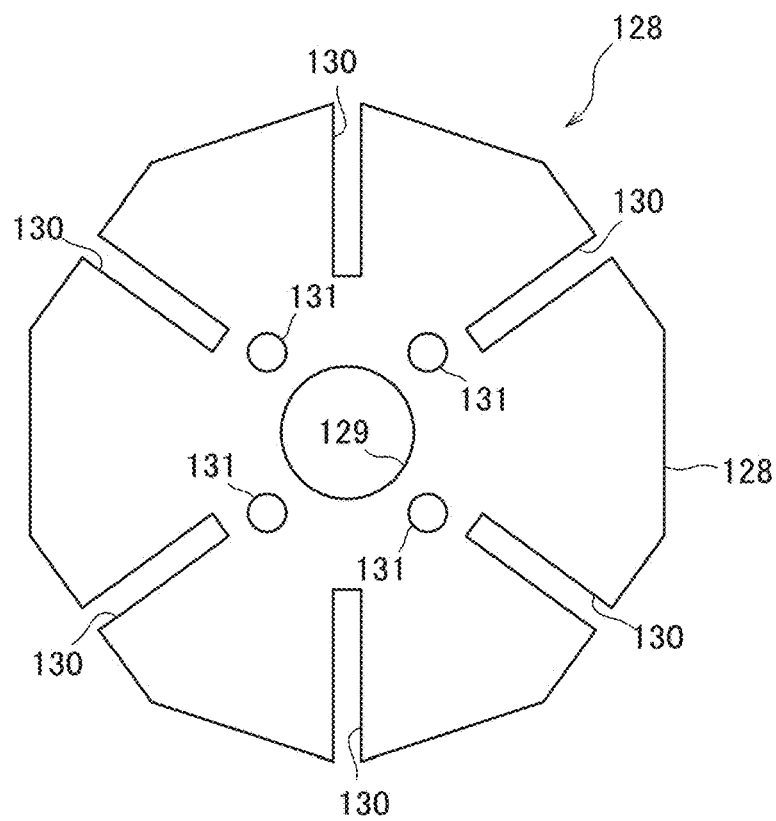
FIG. 16 is a plan view showing a positive electrode current collector in the second embodiment.

In the embodiment, as shown in FIG. 16, a plate member having a decagonal shape in planar view is used. Specifically, the positive electrode current collector 128 is a thin plate made of a Ni-plated steel and having a decagonal shape as a whole, and includes a circular central through-hole 129 at the center and six slits 130 radially extending so as to surround the central through-hole 129. It is preferable to form the slits 130 by punching, and produce projections (burrs) extending downward (to the electrode group 104 side) at edge portions of the slits 130. Furthermore, it is preferable to provide current collector projection portions 131 that extend to the opposite side of the electrode group 104, at predetermined positions around the central through-hole 129, by pressing. The number of the current collector projection portions 131 is not particularly limited. For example, it is preferable to provide four current collector projection portions 131, as shown in FIG. 16.

In the battery 101, as shown in FIG. 15, a current collecting lead 134 is interposed between the positive electrode current collector 128 and the sealing body 114, and the current collecting lead 134 electrically connects the positive electrode current collector 128 connected with the positive electrode 106 of the electrode group 104 and the sealing body 114 including the positive electrode terminal 122.

As is obvious from FIG. 15, the current collecting lead 134 includes a top wall 150 that is connected with the lid plate 116 of the sealing body 114, a bottom wall 136 that is connected with the positive electrode current collector 128, and a pair of side walls 142, 144 that respectively exist between edges 146, 148 on both sides of the top wall 150 and edges 138, 140 on both sides of the bottom wall 136.

The current collecting lead 134 will be described in detail, with respect to FIGS. 17 and 18. FIG. 17 shows a state where the bottom wall 136 is an upper side and the top wall 150 is a lower side, and FIG. 18 shows a state where the bottom wall 136 is a lower side and the top wall 150 is an upper side.

As is obvious from FIG. 17, the bottom wall 136 has a square shape, and a bottom wall through-hole 151 having a circular shape is provided at the center. The bottom wall through-hole 151 is provided in order not to obstruct the supply of the alkaline electrolyte to the electrode group 104 at the time of pouring the alkaline electrolyte into the outer can 102. Here, imaginary circles denoted by reference numeral 156 show welding-intended spots where welding portions are formed when resistance welding is performed. In the embodiment, four welding-intended spots (bottom wall welding-intended portions) 156 are provided on the bottom wall 136, and are respectively positioned near the four corners of the bottom wall 136, so as to surround the bottom wall through-hole 151.

As is obvious from FIG. 18, the top wall 150 is at a position facing the bottom wall 136, and has an oblong shape as a whole. Specifically, the top wall 150 is divided at the center in the shorter direction, by a slit 153 extending along the longer direction. That is, the top wall 150 includes a first half-body portion 152 that is one divided portion and a second half-body portion 154 that is the other divided portion.

Specifically, the first half-body portion 152 and the second half-body portion 154 have facing portions 152c, 154c that face the bottom wall 136, and extending portions 152a, 152b, 154a, 154b that extend from the facing portions 152c, 154c in the longitudinal direction of the top wall 150.

A first semicircular cutout 155 having a semicircular shape and fronting the above slit 153 is provided at the center of the facing portion 152c of the first half-body portion 152. A second semicircular cutout 157 having a semicircular shape and fronting the above slit 153 is provided at the center of the facing portion 154c of the second half-body portion 154. The first semicircular cutout 155 and the second semicircular cutout 157 are at positions facing each other, and form a top wall through-hole 159 having a nearly circular shape as a whole. The top wall through-hole 159 is communicated with the central through-hole 119 of the lid plate 116 when the current collecting lead 134 is connected with the sealing body 114.

The extending portions 152a, 152b, 154a, 154b are provided with lead projection portions 158 that protrude toward the side of the sealing body 114 (see FIG. 18). The lead projection portions 158 are utilized as portions at each of which welding current is concentrated when the resistance welding is performed. That is, in the resistance welding, by the heat that is generated by pressurizing the lead projection portions 158 and in this state, applying a high current concentrically to the lead projection portions 158, the lead projection portions 158 are melted, and the welding between the members is performed. The lead projection portions 158 are welding-intended spots (top wall welding-intended portions) 168 on the top wall 150.

For example, the lead projection portions 158 are formed by pressing. Reference numerical 160 in FIG. 17 denotes concave portions that are produced on the back sides of the lead projection portions 158 when the lead projection portions 158 are provided on the extending portions 152a, 152b, 154a, 154b.

The extending portions 152a, 152b, 154a, 154b extend from the facing portions 152c, 154c, which face the bottom wall 136, to the outside, and the overlap with the bottom wall 136 is avoided. Therefore, at the time of the resistance welding of the current collecting lead 134 to the sealing body 114, a welding rod of a resistance welding machine is allowed to abut on the extending portions 152a, 152b, 154a, 154b, without the interference with the bottom wall 136. Further, since the extending portions 152a, 152b, 154a, 154b extend from the facing portions 152c, 154c, which face the bottom wall 136, to the outside, the extending portions 152a, 152b, 154a, 154b have a function to increase the stability of the current collecting lead 134 when the current collecting lead 134 is connected with the sealing body 114.

As shown in FIG. 17, the side walls 142, 144 extend from the edges 138, 140 on both sides of the bottom wall 136 to the edges 146, 148 on both sides of the top wall 150. The planar-view shape of the side walls 142, 144 is not particularly limited, and for example, an arbitrary shape such as a rectangular shape or a trapezoidal shape can be employed.

Figure 19:
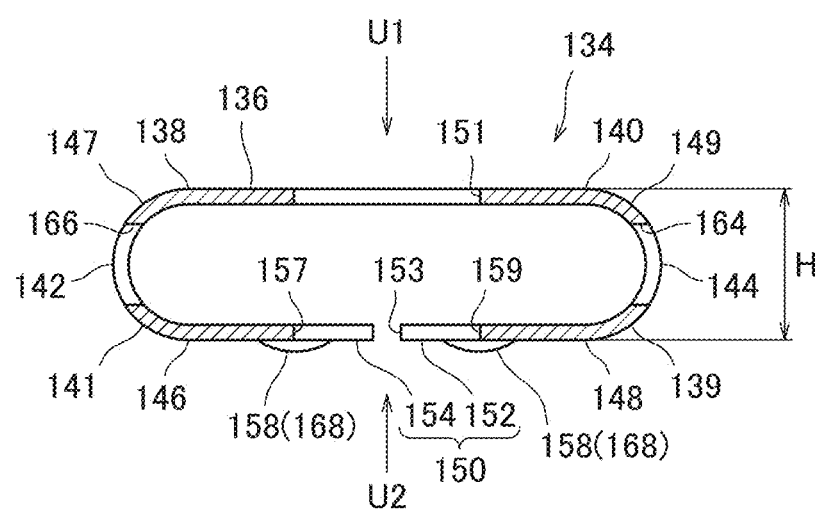
FIG. 19 is a cross-sectional view taken along line V-V in FIG. 17.

As is obvious from FIG. 19 showing a cross-section of the current collecting lead 134, the current collecting lead 134 includes a first corner portion 139 formed by the side wall 144 and the first half-body portion 152 (the top wall 150), a second corner portion 141 formed by the second half-body portion 154 (the top wall 150) and the side wall 142, a third corner portion 147 formed by the side wall 142 and the bottom wall 136, and a fourth corner portion 149 formed by the bottom wall 136 and the side wall 144. The first to fourth corner portions 139, 141, 147, 149 are rounded corners having a curved shape.

In the case where the first to fourth corner portions 139, 141, 147, 149 are rounded corners in this way, the current collecting lead 134 easily deforms in the direction of the compression when a load acts in the direction of an arrow U1 and an arrow U2 in FIG. 19.

In order that the current collecting lead 134 deforms more easily when the compressive load is given, it is preferable that the cross-sectional shape of the side walls 142, 144 be a curved shape that protrudes to the outside, as shown in FIG. 19.

On the side walls 142, 144, side wall through-holes 166, 164 are provided.

The side wall through-holes 166, 164 are provided for decreasing the deformation resistances of the side walls 142, 144. Here, the deformation resistance means the degree of the magnitude of the load necessary for the deformation. The deformation resistance becomes higher as the magnitude of the load necessary for the deformation becomes larger, and the deformation resistance becomes lower as the magnitude of the load necessary for the deformation becomes smaller.

As described above, the side walls 142, 144 on which the side wall through-holes 166, 164 are drilled have a lower deformation resistance, compared to side wall on which the side wall through-holes 166, 164 are not provided. Therefore, the side walls 142, 144 having the side wall through-holes 166, 164 can be deformed by a lower load, compared to the side walls on which the side wall through-holes 166, 164 are not provided. That is, it is easy to deform the side walls 142, 144 having the side wall through-holes 166, 164.

Here, the current collecting lead 134 is a component that electrically connects the current collector 128 and the sealing body 114, and in the interior, electric current flows. In the current collecting lead 134, the flow way of the electric current is not even, and there are high current density portions and low current density portions. That is, also in the side walls 142, 144, there are high current density portions and low current density portions. When the side wall through-holes 166, 164 are provided at the high current density portions in the side walls 142, 144, the cross-sectional areas of portions where electric current flows decrease, and the electric resistance values increase, which can cause the inhibition of the high-rate discharge characteristic of the battery 101. Hence, in embodiments of the present invention, the positions where the side wall through-holes 166, 164 are provided are specified as follows.

That is, on the assumption of imaginary lines (hereinafter, referred to as current path imaginary lines 190) that extend across the top wall 150, the side walls 142, 144 and the bottom wall 136 and that join the welding-intended spots (top wall welding-intended portions) 168 on the top wall 150 and the welding-intended spots (bottom wall welding-intended portions) 156 on the bottom wall 136 by the shortest way, the side wall through-holes 166, 164 are provided at positions away from the current path imaginary lines 190.

Here, when electric current flows from a certain portion (one portion) to another portion (the other portion) in a certain conductive member, the electric current tend to flow through the shortest way between the one portion and the other portion in the conductive member. Therefore, it is thought that the current density is high at a portion along the current path imaginary line 190 that joins the one portion and the other portion by the shortest way, and the current density becomes lower with distance from the current path imaginary line 190. When a through-hole is provided on the conductive member, the cross-sectional area of the conductive member decreases and the electric resistance value increases. It is thought that the electric resistance value considerably increases when such a through-hole is provided at a portion where the current density is high. Conversely, it is thought that the electric resistance value inconsiderably increases even when such a through-hole is provided at a portion where the electric density is low. Therefore, since it is effective to select portions where there is less influence on the increase in the electric resistance value as spots where the side wall through-holes 166, 164 are provided for promoting the deformation of the side walls 142, 144, the side wall through-holes 166, 164 are provided at positions away from portions where the current density is likely to be high (portions of the above current path imaginary lines 190).

The shape of the side wall through-holes 166, 164 is not particularly limited, and an arbitrary shape such as a circular shape, an elliptic shape, a rounded rectangular shape or an oval shape can be employed.

As for the side wall through-holes 166, 164, at least one side wall through-hole is provided on one side wall, and two or more side wall through-holes may be provided on one side wall.

For example, the above current collecting lead 134 can be produced as follows.

Figure 20:
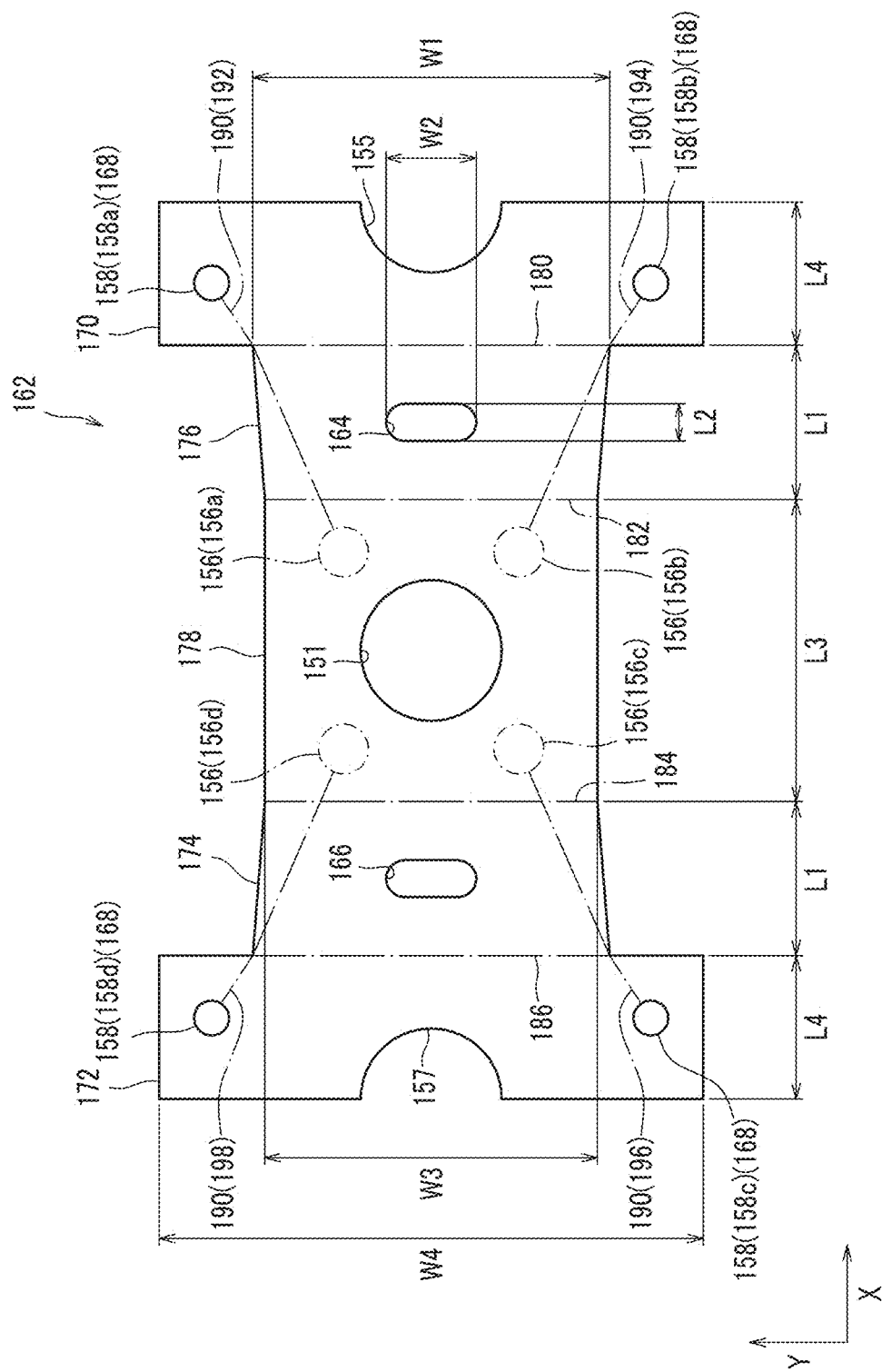
FIG. 20 is a plan view showing an intermediate product for the current collecting lead in the second embodiment.

First, by processing a thin plate made of metal, an intermediate product 162 for the current collecting lead 134 that is formed of a thin plate having a nearly H-shape in planar view shown in FIG. 20 is prepared. The thin plate is sufficiently thicker compared to the conventional positive electrode ribbon. In the intermediate product 162, long positions positioned at both side portions are a first half-body portion-intended region 170 where the first half-body portion 152 is to be formed, and a second half-body portion-intended region 172 where the second half-body portion 154 is to be formed. Regions inside of the first half-body portion-intended region 170 and the second half-body portion-intended region 172 are side wall-intended regions 174, 176 where the side walls 142, 144 are to be formed. Further, a region sandwiched between the side wall-intended region 174 and the side wall-intended region 176 is a bottom wall-intended region 178 where the bottom wall 136 is to be formed.

In the intermediate product 162, by pressing, the lead projection portions 158 are provided at predetermined portions in both end portions of each of the first half-body portion-intended region 170 and the second half-body portion-intended region 172. The lead projection portions 158 melt by resistance welding, so that welding portion are formed. Among the lead projection portions 158, a lead projection portion 158 positioned on the upper side of the first half-body portion-intended region 170 in FIG. 20 is referred to as a lead projection portion 158*a*, a lead projection portion 158 positioned on the lower side of the first half-body portion-intended region 170 in FIG. 20 is referred to as a lead projection portion 158*b*, a lead projection portion 158 positioned on the lower side of the second half-body portion-intended region 172 in FIG. 20 is referred to as a lead projection portion 158*c*, and a lead projection portion 158 positioned on the upper side of the second half-body portion-intended region 172 in FIG. 20 is referred to as a lead projection portion 158*d*.

Furthermore, on the intermediate product 162, by punching, the first semicircular cutout 155 and the second semicircular cutout 157 are provided at the centers of the side edges of the first half-body portion-intended region 170 and the second half-body portion-intended region 172, the bottom wall through-hole 151 is drilled at the center of the bottom wall-intended region 178, and the side wall through-holes 166, 164 are drilled at predetermined positions of the side wall-intended regions 174, 176, respectively.

Four bottom wall welding-intended portions 156 that abut on the current collector projection portions 131 of the positive electrode current collector 128 and where welding portions are to be formed by resistance welding are assumed around the bottom wall through-hole 151 on the bottom wall-intended region 178, and the bottom wall welding-intended portions 156 are expressed as imaginary circles. As the bottom wall welding-intended portions 156, a bottom wall welding-intended portion 156*a*, a bottom wall welding-intended portion 156*b*, a bottom wall welding-intended portion 156*c* and a bottom wall welding-intended portion 156*d* exist around the bottom wall through-hole 151 in clockwise order, as shown in FIG. 20.

In embodiments of the present invention, in the side wall-intended regions 174, 176 (side walls), a direction along the direction (the direction from the bottom wall-intended region 178 toward the first half-body portion-intended region 170) indicated by an arrow X in FIG. 20 is referred to as a height direction of the side wall, and a direction along the direction (the direction in which portions for the extending portions 152a, 152b of the first half-body portion 152 extend in the first half-body portion-intended region 170) indicated by an arrow Y in FIG. 20 is referred to as a width direction of the side wall. Further, the length of the side wall-intended regions 174, 176 in the height direction of the side wall is referred to as a side wall height L1, the length of the side wall through-holes 166, 164 in the height direction of the side wall is referred to as a side wall through-hole height L2, the maximal length of the side wall-intended regions 174, 176 in the width direction of the side wall is referred to as a maximal side wall width W1, and the length of the side wall through-holes 166, 164 in the width direction of the side wall is referred to as a side wall through-hole width W2.

The predetermined positions where the side wall through-holes 166, 164 are drilled will be described below.

In the intermediate product 162, the current path imaginary lines 190 that join the lead projection portions 158 (the top wall welding-intended portions 168) and the bottom wall welding-intended portions 156 by the shortest way in the intermediate product 162 are assumed in the intermediate product 162. In the embodiment, a current path imaginary line 192 that joins the lead projection portion 158a and the welding portion-intended region 156a, a current path imaginary line 194 that joins the lead projection portion 158b and the welding portion-intended region 156b, a current path imaginary line 196 that joins the lead projection portion 158c and the welding portion-intended region 156c, and a current path imaginary line 198 that joins the lead projection portion 158d and the welding portion-intended region 156d are assumed.

The side wall through-holes 166, 164 are drilled at positions away from the current path imaginary lines 192, 194, 196, 198. Specifically, the side wall through-holes 166, 164 do not cross at least the current path imaginary lines 192, 194, 196, 198. Further, the side wall through-holes 166, 164 are provided as far away from the current path imaginary lines 192, 194, 196, 198 as possible. In the embodiment, each of the side wall through-holes 166, 164 is provided at a central portion in the height direction of the side wall. This is because when the through-hole exists at the central portion in the height direction of the side wall, the side wall is likely to deform more easily than when the through-hole exists at a position that deviates in the height direction of the side wall. Further, in the side wall-intended region 174 positioned on the left side in FIG. 20, the side wall through-hole 166 on the left side is drilled at a middle portion between the current path imaginary line 196 and the current path imaginary line 198 such that these imaginary lines are the same distance away from the side wall through-hole 166, and in the side wall-intended region 176 positioned on the right side in FIG. 20, the side wall through-hole 164 on the right side is drilled at a middle portion between the current path imaginary line 192 and the current path imaginary line 194 such that these imaginary lines are the same distance away from the side wall through-hole 164.

The size of the side wall through-holes 166, 164 is not particularly limited. Preferably, the dimension of the side wall through-hole width W2 should be set to 9% or more and 60% or less of the dimension of the maximal side wall width W1, and more preferably, should be set to 9% or more and 40% or less of the dimension of the maximal side wall width W1. This is because the current collecting lead 134 is hard to deform when the dimension of the side wall through-hole width W2 is less than 9% of the dimension of the maximal side wall width W1. Further, this is because the electric resistance value of the current collecting lead 134 becomes high when the dimension of the side wall through-hole width W2 is exceeding 60% of the dimension of the maximal side wall width W1 and the increasing rate of the electric resistance value can be kept low when the dimension of the side wall through-hole width W2 is 40% or less of the dimension of the maximal side wall width W1.

In the case where two or more side wall through-holes are provided on one side wall, it is preferable that the dimension of the total width of the side wall through-holes be set to 9% or more and 40% or less of the dimension of the maximal width of the side wall.

The intermediate product 162 obtained by performing the above pressing and punching is folded at portions of a folding imaginary line 180 assumed between the first half-body portion-intended region 170 and the side wall-intended region 176, a folding imaginary line 182 assumed between the side wall-intended region 176 and the bottom wall-intended region 178, a folding imaginary line 184 assumed between the bottom wall-intended region 178 and the side wall-intended region 174 and a folding imaginary line 186 assumed between the side wall-intended region 174 and the second half-body portion-intended region 172, and thereby, the current collecting lead 134 shown in FIGS. 17 and 18 is formed. It is preferable that the side wall-intended regions 174, 176 be processed to a curved shape.

Next, an example of the procedure of the assembly of the battery 101 will be described.

First, the above electrode group 104 is prepared. Then, the negative electrode current collector is connected with the other end side of the electrode group 104, and thereafter, the electrode group 104 is placed into the outer can. Then, the resistance welding of the negative electrode current collector is performed to the bottom wall of the outer can.

Next, the positive electrode current collector 128 is put on the one end side of the electrode group 104, and the resistance welding between the positive electrode connection edge portion 132 of the electrode group 104 and the positive electrode current collector 128 is performed. At this time, electric current concentrates at portions where the burrs of the slits 130 of the positive electrode current collector 128 contact with the positive electrode connection edge portion 132, and the welding portions are formed, so that the positive electrode connection edge portion 132 of the positive electrode 106 and the positive electrode current collector 128 are welded.

Next, a predetermined amount of alkaline electrolyte is poured into the outer can 102. The alkaline electrolyte poured into the outer can 102 is held by the electrode group 104, and most of the alkaline electrolyte is held by the separator 110. The alkaline electrolyte promotes electro-chemical reactions (charge and discharge reactions) at the time of the charge and discharge between the positive electrode 106 and the negative electrode 108. As the alkaline electrolyte, it is preferable to use an alkaline electrolyte containing, as a solute, at least one kind of KOH, NaOH and LiOH.

Meanwhile, in a different process, the resistance welding between the inner surface of the lid plate 116 of the sealing body 114 and the top wall 150 of the current collecting lead 134 is performed, and a complex of the sealing body 114 and the current collecting lead 134 is formed. Specifically, electric current concentrates at portions where the projection portions 158 on the first half-body portion 152 and second half-body portion 154 as the top wall 150 of the current collecting lead 134 contact with the inner surface of the lid plate 116 of the sealing body 114, and the welding portions are formed. Thereby, the complex in which the sealing body 114 and the current collecting lead 134 are welded is obtained.

Next, the above complex is put on the positive electrode current collector 128. At this time, the position adjustment of the complex is performed on the basis of the slits 130 of the positive electrode current collector 128, such that the welding-intended spots 156 on the bottom wall 136 of the current collecting lead 134 contact with the current collecting projection portions 131 of the positive electrode current collector 128. The insulating gasket 118 is provided at the outer peripheral edge of the lid plate 116 of the sealing body 114, and the lid plate 116 is positioned in the upper end opening portion of the outer can 102, with the insulating gasket 118.

Thereafter, electric current is applied between the positive electrode terminal 122 and negative electrode terminal of the battery 101, under pressure, and the resistance welding (projection welding) is performed. At this time, the electric current concentrates at portions where the current collector projection portions 131 of the positive electrode current collector 128 contact with the welding-intended spots 156 on the bottom wall 136 of the current collecting lead 134, and the welding portions are formed, so that the positive electrode current collector 128 and the bottom wall 136 of the current collecting lead 134 are welded.

After the above welding is completed, the opening 103 of the outer can 102 is sealed by crimping the opening rim 117 of the outer can 102. Thus, the battery 101 is formed.

At the time of the above resistance welding and at the time of the above crimping, a compressive load is applied in a direction along the axis line of the battery 101, to components constituting the battery 101, as exemplified by the electrode group 104, the positive electrode current collector 128 and the current collecting lead 134. Here, when the compressive load acts in a direction in which the top wall 150 and the bottom wall 136 approach each other (the direction of the arrow U1 and the direction of the arrow U2 in FIG. 19), the current collecting lead 134 deforms from portions of the side walls 142, 144 because the side walls 142, 144 easily deform, and as a whole, the current collecting lead 134 crushes in the direction in which the top wall 150 and the bottom wall 136 approach each other. When the current collecting lead 134 easily deforms in this way, even if the compressive load is applied to the current collecting lead 134 and the positive electrode current collector 128, the current collecting lead 134 preferentially deforms. Therefore, the deformation of the positive electrode current collector 128 is suppressed, so that it is possible to inhibit the positive electrode current collector 128 from pressing the electrode group 104. As a result, it is possible to inhibit the occurrence of the internal short-circuit of the battery.

In embodiments of the present invention, for making the current collecting lead 134 deform more easily than the positive electrode current collector 128, the side wall through-holes 164, 166 are provided on the side walls 142, 144 of the current collecting lead 134 such that the deformation resistance of the current collecting lead 134 is smaller than the deformation resistance of the positive electrode current collector 128. Here, the side wall through-holes 164, 166 are provided at positions away from the current path imaginary lines 190 in the current collecting lead 134, and therefore, the rise in the internal resistance of the battery 101 is suppressed. Accordingly, it is possible to maintain a good high-rate discharge characteristic.

Therefore, according to embodiments of the present invention, it is possible to obtain a secondary battery that maintains a good high-rate discharge characteristic and that causes the internal short-circuit less-frequently than conventional secondary batteries.

In recent years, the size reduction of various devices has been promoted, and small-size devices have been also required to discharge electricity at a high rate. In such a situation, small-size batteries to be used in small-size devices, as exemplified by a 4/3 FA type battery, an AA type (corresponding to R6 type, or Tan 3 type (which is the term in Japan)) battery and an AAA type (corresponding to R03 type, or Tan 4 type (which is the term in Japan)) battery, have been also required to discharge electricity at a higher rate.

However, in the small-size batteries, it is necessary to reduce the size of the current collecting lead, compared to large-size batteries, as exemplified by a D type (corresponding to R20 type, or Tan 1 type (which is the term in Japan)) battery and a C type (corresponding to R14 type, or Tan 2 type (which is the term in Japan)) battery. The flexibility of the current collecting lead decreases due to the size reduction of the current collecting lead. Therefore, when the compressive load is applied in the direction of the axis line of the battery, the current collecting lead does not sufficiently deform, and the load is directly transmitted to the current collector. As a result, the positive electrode current collector deforms, and presses the electrode group, so that the short-circuit occurs more easily. Further, in the small-size batteries, the winding number of the electrode group is small, and therefore, the strength of the electrode group itself in the axis line direction is low. Therefore, in a small-size battery in which a simply size-reduced current collecting lead is used for obtaining a good high-rate discharge characteristic, the deformation of the positive electrode current collector causes the short-circuit more easily, compared to large-size batteries.

Against such a situation, embodiments of the present invention preferentially deform the current collecting lead, and suppress the deformation of the positive electrode current collector, so that it is possible to avoid the press to the electrode group. Therefore, embodiments of the present invention are effective, particularly, in suppressing the occurrence of the short-circuit of a small-size battery having a good high-rate discharge characteristic, specifically, a battery having a diameter of 18 mm or less.

EXAMPLES

Example 1

The positive electrode 6, the negative electrode 8 and the separator 10 that were used in a typical nickel-hydrogen secondary battery were prepared. The positive electrode 6, the negative electrode 8 and the separator 10 had belt-like shapes, respectively. The prepared positive electrode 6 and the negative electrode 8 were spirally wound while the separator 10 was interposed therebetween, so that the electrode group 4 for the AA size was formed. At the time of the winding, the positive electrode 6 and the negative electrode 8 were disposed so as to deviate from each other in a direction along the axis line of the electrode group 4, and the separator 10 was disposed at a predetermined position between the positive electrode 6 and the negative electrode 8. Then, in this state, the winding was performed, so that the columnar electrode group 4 was obtained. In the obtained electrode group 4, on one end side of the electrode group 4, the positive electrode connection edge portion 32 of the positive electrode 6 protruded relative to the negative electrode 8 that was adjacent across the separator 10, and on the other end side of the electrode group 4, the negative electrode connection edge portion of the negative electrode 8 protruded relative to the positive electrode 6 that was adjacent across the separator 10.

Next, a negative electrode current collector for the AA size that had a disc shape and that was formed of a thin plate of a Ni-plated steel was prepared. The negative electrode current collector was welded to the negative electrode connection edge portion of the electrode group 4.

Next, the positive electrode current collector 28 for the AA size shown in FIG. 2 that had a decagonal shape as a whole and that included the circular central through-hole 29 at the center and the six slits 30 radially extending so as to surround the central through-hole 29 was prepared. The positive electrode current collector 28 was formed of a Ni-plated steel plate resulting from performing Ni-plating to a thin plate composed of a steel in which the carbon content was 0.04 mass %. The thickness of the positive electrode current collector 28 was 0.40 mm. In Table 1, the value of this thickness is shown as the thickness of the current collector.

Next, a Ni-plated steel plate resulting from performing Ni-plating to a thin plate composed of a steel in which the carbon content was 0.04 mass % was prepared. The thickness of the Ni-plated steel plate was 0.30 mm. Then, the nearly H-shaped intermediate product 62 for the current collecting lead shown in FIG. 5 was produced by punching the Ni-plated steel plate. The through-hole 54 was drilled at the center of the intermediate product 62, and the projection portions 56, 58 were formed at predetermined positions by pressing. Then, the current collecting lead 34 shown in FIG. 3 was formed by folding the portions of the imaginary lines 80, 82, 84, 86. Here, each of the portions of imaginary lines 80, 82, 84, 86 was folded such that the curvature radius was 0.90 mm. Thereby, the first to fourth corner portions 39, 41, 47, 49 of the current collecting lead 34 were rounded corners in each of which the curvature radius was 0.90 mm. In Table 1, the value of the thickness of the Ni-plated steel plate used for the production of the current collecting lead 34 is shown as the thickness of the current collecting lead 34.

Next, the electrode group 4 having the negative electrode current collector welded was placed into the outer can 2 having a bottomed cylindrical shape. Then, the inner surface of the bottom wall of the outer can 2 and the negative electrode current collector were welded.

Next, a pressure sensor was provided at an upper end portion of the electrode group 4, such that the compressive load to be applied to the electrode group 4 can be measured. A signal wire of the pressure sensor was led to the outside through a hole previously drilled at a predetermined position of the outer can 2, and was connected with a measurement apparatus for the compressive load. Then, the positive electrode current collector 28 was put on the pressure sensor, and further, the current collecting lead 34 was put on the positive electrode current collector 28, so that an intermediate product for a load measurement battery for which the compressive load acting on the electrode group 4 would be measured was produced. Then, the intermediate product for the load measurement battery was set in a resistance spot welding machine, and a first simulated resistance spot welding was performed by applying a load of 25 kgf, which was the same compressive load as that at the time of welding, in the axis line direction of the intermediate product for the battery without applying welding current. Next, the sealing body 14 was disposed in the upper end opening portion of the outer can 2 of the intermediate product for the battery, with the insulating gasket 18. At this time, the sealing body 14 and the current collecting lead 34 were in a contact state. Then, the intermediate product for the load measurement battery in this state was set in the resistance spot welding machine again, and a second simulated resistance spot welding was performed by applying a load of 25 kgf, which was the same compressive load as that at the time of welding, in the axis line direction of the intermediate product for the battery without applying welding current. Thereafter, the opening 3 of the outer can 2 was sealed by crimping the opening rim 17 of the outer can 2, so that the battery for the load measurement battery was produced. By the second simulated resistance spot welding and the crimping, the sealing body 14 disposed in the upper end opening portion of the outer can 2 was descended to the electrode group 4 side by 0.60 mm.

Using the above intermediate product for the load measurement battery, compressive loads to be applied to the electrode group 4 by the compression operation in the resistance spot welding machine and the crimping were measured. In Table 1, the maximal value of the measurement values is shown as the maximal load on the electrode group.

Example 2

A load measurement battery was produced in the same way as Example 1, except that the current collecting lead 34 was formed such that the first to fourth corner portions 39, 41, 47, 49 of the current collecting lead 34 were rounded corners having a curvature radius of 0.70 mm.

Example 3

A load measurement battery was produced in the same way as Example 1, except that the current collecting lead 34 was formed such that the first to fourth corner portions 39, 41, 47, 49 of the current collecting lead 34 were rounded corners having a curvature radius of 0.40 mm.

Comparative Example 1

A load measurement battery was produced in the same way as Example 1, except that the current collecting lead 34 was formed such that the first to fourth corner portions 39, 41, 47, 49 of the current collecting lead 34 were not rounded corners but right-angled corners.

Figure 14:
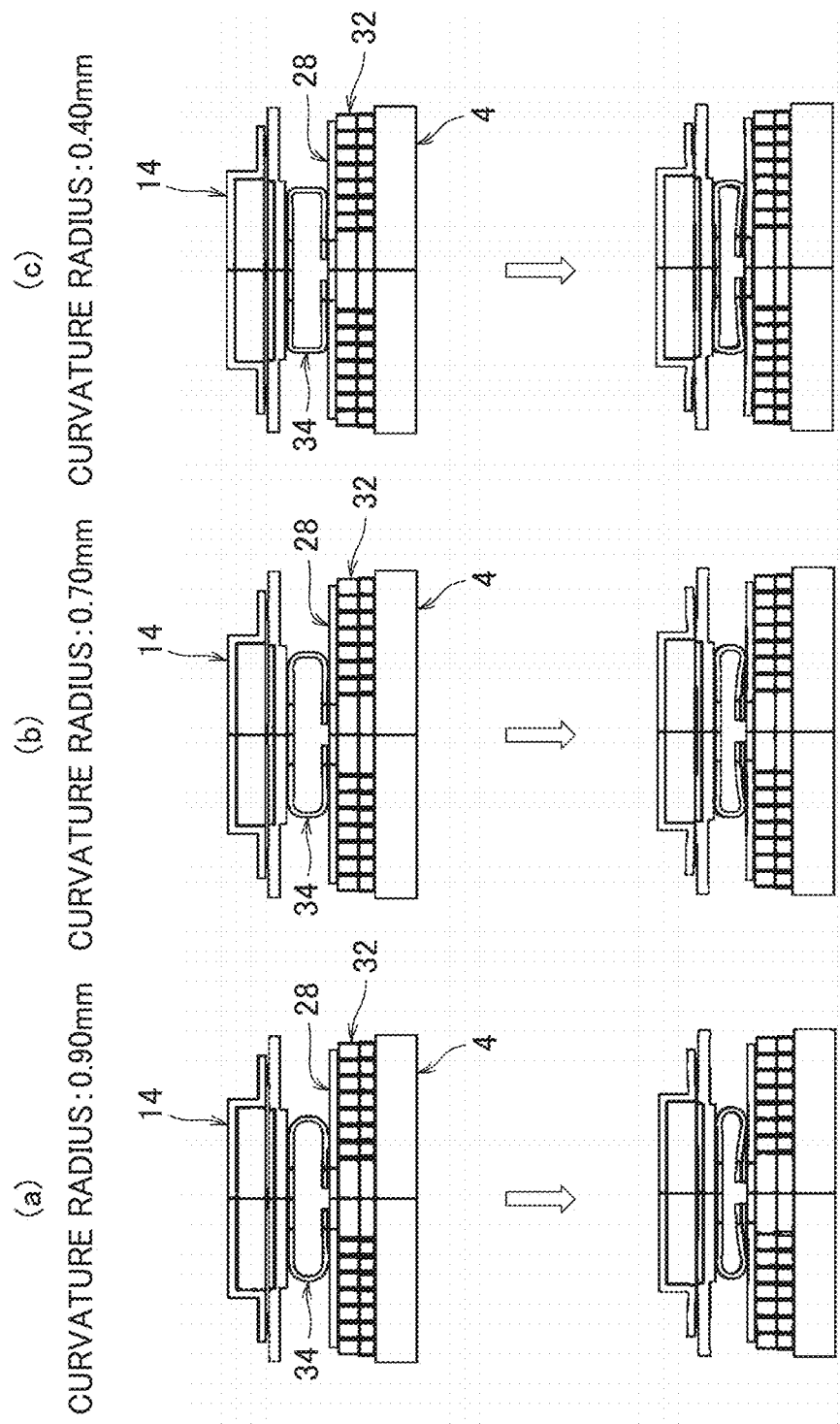
FIG. 14 is an analysis diagram showing analysis results of changes in shapes of a sealing body, the current collecting lead, the current collector and the electrode group.

For the sealing body 14, the current collecting lead 34, the positive electrode current collector 28 and the electrode group 4 in Examples 1 to 3, the shapes in a state before the resistance spot welding and the crimping (hereinafter, referred to as a state before deformation) and a state after the sealing body was descended by 0.6 mm, that is, a state after the resistance spot welding and the crimping (hereinafter, referred to as a state after deformation) were analyzed. The analysis result is shown in FIG. 14. FIG. 14(*a*) shows the result for Example 1 in which the curvature radius was 0.90 mm, FIG. 14(*b*) shows the result for Example 2 in which the curvature radius was 0.70 mm, and FIG. 14(*c*) shows the result for Example 3 in which the curvature radius was 0.40 mm. In each of them, the upper figure shows the state before deformation, and the lower figure shows the state after deformation.

TABLE 1

| | Curvature radius of current collecting lead [mm] | Thickness of current collecting lead [mm] | Thickness of current collector [mm] | Maximal load on electrode group [kgf] |
|---|---|---|---|---|
| Example 1 | 0.90 | 0.30 | 0.40 | 37.1 |
| Example 2 | 0.70 | 0.30 | 0.40 | 47.7 |
| Example 3 | 0.40 | 0.30 | 0.40 | 70.9 |
| Comparative Example 1 | — | 0.30 | 0.40 | 90.0 |

Example 4

(1) Production of Current Collecting Lead

A Ni-plated steel plate in which a Ni plating having a thickness of 2 μm was performed to a thin steel plate equivalent to a so-called SPCC (cold-rolled steel plate) was prepared. The thickness of the Ni-plated steel plate was 0.30 mm. Then, the punching and the pressing were performed to the Ni-plated steel plate, and thereby, the nearly H-shaped intermediate product 162 for the current collecting lead shown in FIG. 20 was produced. On the intermediate product 162, the through-hole 151 was drilled at the center, the first semicircular cutout 155 and the second semicircular cutout 157 were drilled at predetermined positions of the first half-body portion-intended region 170 and second half-body portion-intended region 172 on both sides, and the side wall through-holes 166, 164 having a rounded rectangular shape were drilled at predetermined positions of the side wall-intended regions 174, 176. Further, the lead projection portions 158 were formed at predetermined positions of the first half-body portion-intended region 170 and the second half-body portion-intended region 172. In Example 4, the side wall through-holes 166, 164 were drilled at positions away from the current path imaginary lines 192, 194, 196, 198, so as not to cross the current path imaginary lines 192, 194, 196, 198.

The dimensions of the parts of the intermediate product 162 will be described below.

The maximal side wall width W1 was 8.18 mm, the side wall through-hole width W2 was 1.5 mm, the side wall height L1 was 3.46 mm, and the side wall through-hole height L2 was 0.6 mm. The length L3 of the bottom wall-intended region 178 in the direction indicated by the arrow X was 6.4 mm, the length L4 of the first half-body portion-intended region 170 and second half-body portion-intended region 172 in the direction indicated by the arrow X was 3.1 mm, the length W3 of the bottom wall-intended region 178 in the direction indicated by the arrow Y was 7.5 mm, and the length W4 of the first half-body portion-intended region 170 and second half-body portion-intended region 172 in the direction indicated by the arrow Y was 12.4 mm. The radius of the bottom wall through-hole 151, the first semicircular cutout 155 and the second semicircular cutout 157 was 1.5 mm.

Next, the portions of the folding imaginary lines 180, 182, 184, 186 are folded, and thereby, the current collecting lead 134 shown in FIGS. 17 and 18, in which the corner portions were rounded corners that were curved, was formed.

Figure 21:
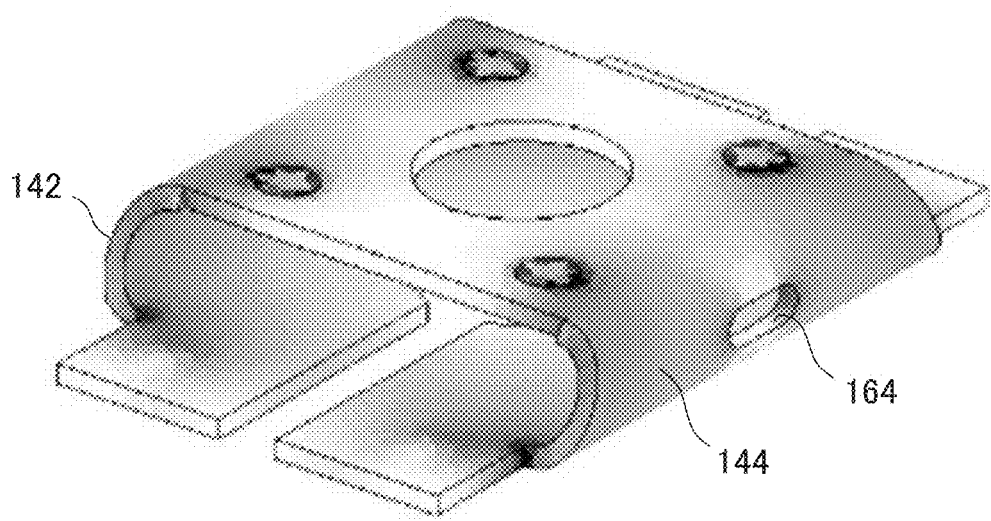
FIG. 21 is a perspective view showing an analysis result of current distribution of a current collecting lead according to Example 4.
Figure 22:
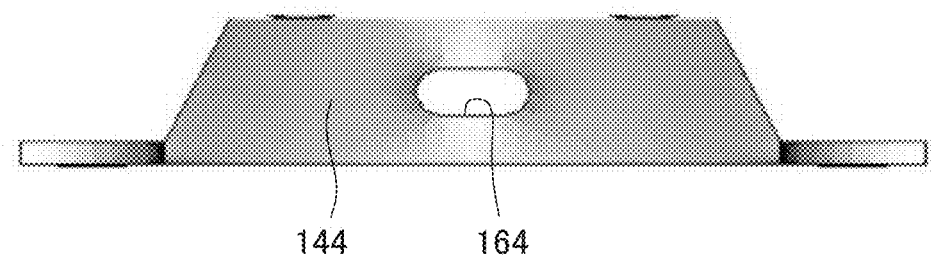
FIG. 22 is a side view showing an analysis result of current distribution of the current collecting lead according to Example 4.

For the obtained current collector 134, the analysis of the current distribution was performed, and the visualization of the current density was performed. FIGS. 21 and 22 show the obtained analysis result of the current distribution. In FIGS. 21 and 22, the intensity of the gray color indicates the level of the current density. The darker the gray color, the higher the current density. The lighter the gray color, the lower the current density.

Further, for the obtained current collecting lead 134, the electric resistance value between the top wall portion 150 and the bottom wall portion 136 was measured. As a result, the electric resistance value of the current collecting lead 134 in Example 4 was 0.35 mΩ.

(2) Production of Battery

The positive electrode 106, the negative electrode 108 and the separator 110 that were used in a typical nickel-hydrogen secondary battery were prepared. The positive electrode 106, the negative electrode 108 and the separator 110 have belt-like shapes, respectively. While the separator 110 was interposed between the prepared positive electrode 106 and negative electrode 108, they were spirally wound, so that the electrode group 104 for the 4/3 FA size was formed. At the time of the winding, the positive electrode 106 and the negative electrode 108 were disposed so as to slightly deviate from each other in a direction along the axis line direction of the electrode group 104, and the separator 110 was disposed at a predetermined position between the positive electrode 106 and the negative electrode 108. In this state, the winding was performed, so that the columnar electrode group 104 was obtained. In the obtained electrode group 104, on one end side of the electrode group 104, the positive electrode connection edge portion 132 of the positive electrode 106 protruded relative to the negative electrode 108 that was adjacent across the separator 110, and on the other end side of the electrode group 104, the negative electrode connection edge portion of the negative electrode 108 protruded relative to the positive electrode 106 that was adjacent across the separator 110.

Next, the negative electrode current collector for the 4/3 FA size that had a disc shape and that was formed of a thin plate of a Ni-plated steel was prepared. The negative electrode current collector was welded to the negative electrode connection edge portion of the electrode group 104.

Next, the positive electrode current collector 128 for the 4/3 FA size shown in FIG. 16 that had a decagonal shape as a whole and that included the circular central through-hole 129 at the center and the six slits 130 radially extending so as to surround the central through-hole 129 was prepared. The positive electrode current collector 128 was formed of a Ni-plated steel plate in which a Ni plating was performed to a thin steel plate equivalent to a so-called SPCC (cold-rolled steel plate). The thickness of the positive electrode current collector 128 was 0.40 mm.

Next, the electrode group 104 to which the negative electrode current collector was welded was placed into the outer can 102 having a bottomed cylindrical shape. Then, the inner surface of the bottom wall of the outer can 102 and the negative electrode current collector were welded.

Next, the positive electrode current collector 128 was put on an upper end portion of the electrode group 104, and the resistance welding between the positive electrode connection edge portion 132 of the electrode group 104 and the positive electrode current collector 128 was performed.

Next, a predetermined amount of an alkaline electrolyte containing KOH as a solute was poured into the outer can 102.

Next, the resistance welding of the current collecting lead 134 produced as described above was performed to the sealing body 114, and the complex of the sealing body 114 and the current collecting lead 134 was formed. Specifically, electric current concentrated at the portions where the projection portions 158 on the first half-body portion 152 and second half-body portion 154 as the top wall 150 of the current collecting lead 134 contacted with the inner surface of the lid plate 116 of the sealing body 114, and the welding portions were formed. Thereby, the complex in which the sealing body 114 and the current collecting lead 134 were welded was obtained.

The obtained complex was put on the positive electrode current collector 128. At this time, the position adjustment of the complex was performed on the basis of the slits 130 of the positive electrode current collector 128, such that the welding-intended spots 156 on the bottom wall 136 of the current collecting lead 134 contacted with the current collector projection portions 131 of the positive electrode current collector 128. The insulating gasket 118 was provided at the outer peripheral edge of the lid plate 116 of the sealing body 114. Thereby, the lid plate 116 was positioned in the upper end opening portion of the outer can 102, with the insulating gasket 118.

Thereafter, electric current was applied between the positive electrode terminal 122 on the sealing body 114 and the negative electrode terminal, under pressure, and the resistance welding (projection welding) was performed. At this time, the electric current concentrated at the portions where the current collector projection portions 131 of the positive electrode current collector 128 contacted with the welding-intended spots 156 on the bottom wall 136 of the current collecting lead 134, and the welding portions were formed, so that the positive electrode current collector 128 and the bottom wall 136 of the current collecting lead 134 were welded.

After the above welding was completed, the opening 103 of the outer can 102 was sealed by crimping the opening rim 117 of the outer can 102. Thus, the battery 101 was produced.

The X-ray photography of the obtained battery 101 was performed, and the condition of the positive electrode connection edge portion 132 in the interior was observed. As a result of the observation, a buckling to cause the short-circuit at the positive electrode connection edge portion 132 was not recognized.

Example 5

Figure 23:
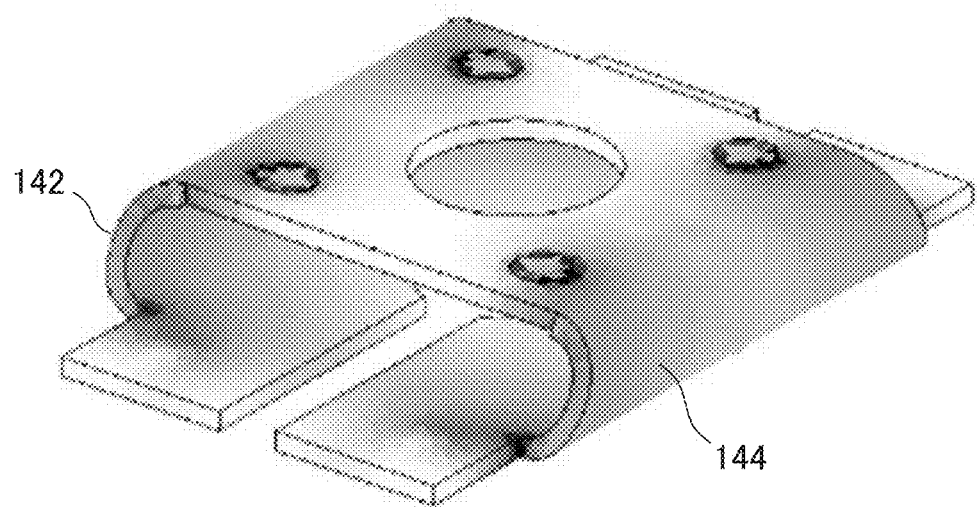
FIG. 23 a perspective view showing an analysis result of current distribution of a current collecting lead according to Example 5.
Figure 24:
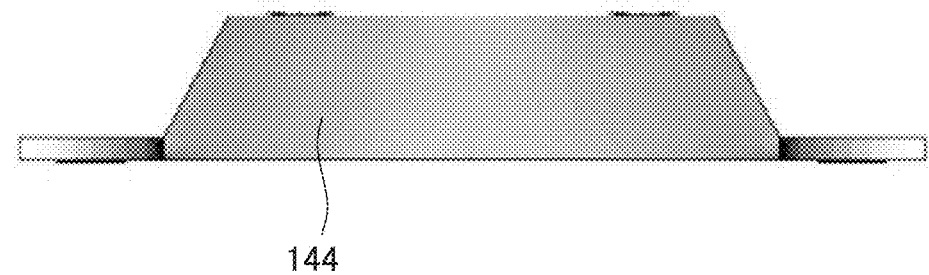
FIG. 24 is a side view showing an analysis result of current distribution of the current collecting lead according to Example 5.

A current collecting lead was produced in the same way as Example 4, except that the side wall through-holes were not provided. FIGS. 23 and 24 show the analysis result of the current distribution of the current collecting lead. The electric resistance value of the current collecting lead in Example 5 was 0.31 mΩ.

Next, using the current collecting lead having no side wall through-hole according to Example 5, a battery was produced in the same way as Example 4.

The X-ray photography of the obtained battery was performed, and the internal condition was observed. As a result, buckling spots were recognized at parts of the positive electrode connection edge portion 132 of the electrode group 104.

Example 6

Figure 25:
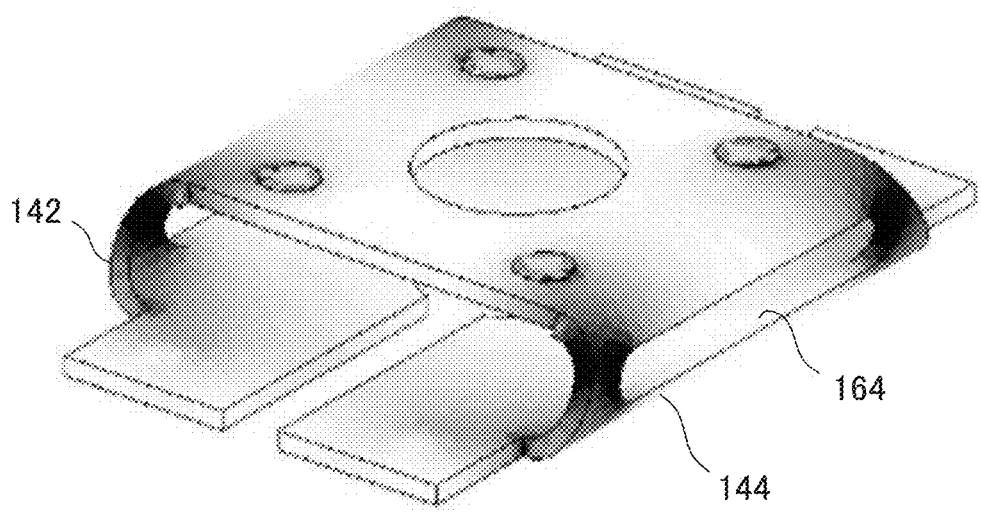
FIG. 25 is a perspective view showing an analysis result of current distribution of a current collecting lead according to Example 6.
Figure 26:
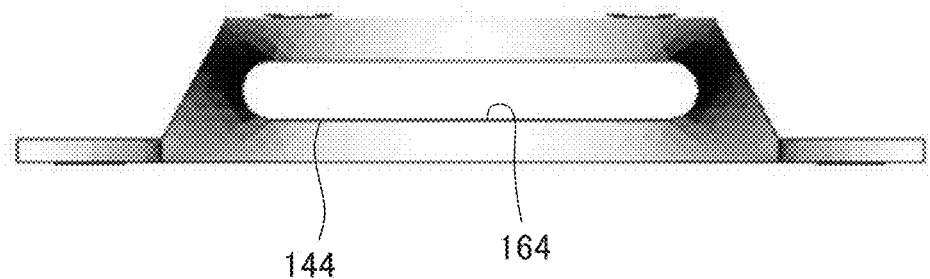
FIG. 26 is a side view showing an analysis result of current distribution of the current collecting lead according to Example 6.

A current collecting lead was produced in the same way as Example 4, except that the side wall through-hole width W2 was 6.0 mm, the side wall through-hole height L2 was 0.8 mm and the side wall through-holes were formed so as to cross the current path imaginary lines 190. FIGS. 25 and 26 show the analysis result of the current distribution of the current collecting lead. The electric resistance value of the current collecting lead in Example 6 was 0.95 mΩ.

Next, using the current collecting lead in Example 6, a battery was produced in the same way as Example 4.

The X-ray photography of the obtained battery was performed, and the internal condition was observed. As a result, a buckling to cause the short-circuit at the positive electrode connection edge portion 132 was not recognized.

Example 7

A current collecting lead was produced in the same way as Example 4, except that the side wall through-hole height L2 was 0.31 mm and the side wall through-hole width W2 was 1.54 mm. On this occasion, the ratio of the side wall through-hole height L2 to the side wall height L1 was 9%, and the ratio of the side wall through-hole width W2 to the maximal side wall width W1 was 19%.

For the obtained current collecting lead, the electric resistance value between the top wall portion 150 and the bottom wall portion 136 was measured. From the obtained measurement result, the increasing rate of the electric resistance value with respect to the electric resistance value in Example 5 was evaluated. The resistance value increasing rate of the current collecting lead in Example 7 was 2.8%.

Next, the electrode group 104 in which the negative electrode current collector and the positive electrode current collector were welded was prepared in the same way as Example 4.

The current collecting lead in Example 7 was put on the positive electrode current collector of the prepared electrode group 104. In this state, a compressive load was applied to the electrode group 104 and the current collecting lead, in a direction along the axis line direction of the electrode group 104, and at the time when the positive electrode connection edge portion 132 of the electrode group 104 buckled, the application of the compressive load was stopped. Then, the crushed current collecting lead was taken out, and the length of the crush in the height direction H (see FIG. 19) was evaluated by subtracting the dimension of the current collecting lead after the crush in the height direction H from the dimension of the current collecting lead before the crush in the height direction H. The length of the crush was obtained as a current collecting lead crush amount. The current collecting lead crush amount in Example 7 was 0.87 mm.

Example 8

A current collecting lead was produced in the same way as Example 4, except that the side wall through-hole height L2 was 0.31 mm and the side wall through-hole width W2 was 3.03 mm. On this occasion, the ratio of the side wall through-hole height L2 to the side wall height L1 was 9%, and the ratio of the side wall through-hole width W2 to the maximal side wall width W1 was 37%.

Then, the resistance value increasing rate of the current collecting lead and the current collecting lead crush amount were evaluated in the same way as Example 7. In Example 8, the resistance value increasing rate of the current collecting lead was 5.6%, and the current collecting lead crush amount was 1.09 mm.

Example 9

A current collecting lead was produced in the same way as Example 4, except that the side wall through-hole height L2 was 0.31 mm and the side wall through-hole width W2 was 4.67 mm. On this occasion, the ratio of the side wall through-hole height L2 to the side wall height L1 was 9%, and the ratio of the side wall through-hole width W2 to the maximal side wall width W1 was 57%.

Then, the resistance value increasing rate of the current collecting lead and the current collecting lead crush amount were evaluated in the same way as Example 7. In Example 9, the resistance value increasing rate of the current collecting lead was 19.4%, and the current collecting lead crush amount was 1.12 mm.

Example 10

A current collecting lead was produced in the same way as Example 4, except that the side wall through-hole height L2 was 0.31 mm and the side wall through-hole width W2 was 6.14 mm. On this occasion, the ratio of the side wall through-hole height L2 to the side wall height L1 was 9%, and the ratio of the side wall through-hole width W2 to the maximal side wall width W1 was 75%. In Example 10, the side wall through-holes crossed the current path imaginary lines 90.

Then, the resistance value increasing rate of the current collecting lead and the current collecting lead crush amount were evaluated in the same way as Example 7. In Example 10, the resistance value increasing rate of the current collecting lead was 47.2%, and the current collecting lead crush amount was 1.20 mm.

Example 11

A current collecting lead was produced in the same way as Example 4, except that the side wall through-hole height L2 was 0.62 mm and the side wall through-hole width W2 was 3.03 mm. On this occasion, the ratio of the side wall through-hole height L2 to the side wall height L1 was 18%, and the ratio of the side wall through-hole width W2 to the maximal side wall width W1 was 37%.

Then, the resistance value increasing rate of the current collecting lead and the current collecting lead crush amount were evaluated in the same way as Example 7. In Example 11, the resistance value increasing rate of the current collecting lead was 6.5%, and the current collecting lead crush amount was 1.05 mm.

Example 12

A current collecting lead was produced in the same way as Example 4, except that the side wall through-hole height L2 was 0.93 mm and the side wall through-hole width W2 was 3.03 mm. On this occasion, the ratio of the side wall through-hole height L2 to the side wall height L1 was 27%, and the ratio of the side wall through-hole width W2 to the maximal side wall width W1 was 37%.

Then, the resistance value increasing rate of the current collecting lead and the current collecting lead crush amount were evaluated in the same way as Example 7. In Example 12, the resistance value increasing rate of the current collecting lead was 7.4%, and the current collecting lead crush amount was 1.07 mm.

Example 13

A current collecting lead was produced in the same way as Example 4, except that the side wall through-hole height L2 was 1.25 mm and the side wall through-hole width W2 was 3.03 mm. On this occasion, the ratio of the side wall through-hole height L2 to the side wall height L1 was 36%, and the ratio of the side wall through-hole width W2 to the maximal side wall width W1 was 37%.

Then, the resistance value increasing rate of the current collecting lead and the current collecting lead crush amount were evaluated in the same way as Example 7. In Example 13, the resistance value increasing rate of the current collecting lead was 8.3%, and the current collecting lead crush amount was 1.09 mm.

Figure 27:
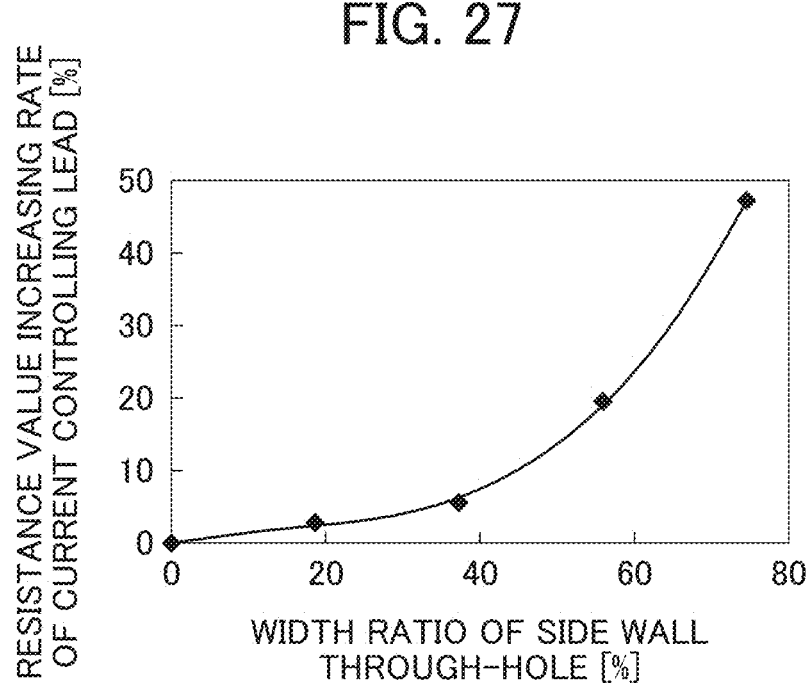
FIG. 27 is a graph showing a relation between a width ratio of a side wall through-hole and a resistance value increasing rate of the current collecting lead.
Figure 28:
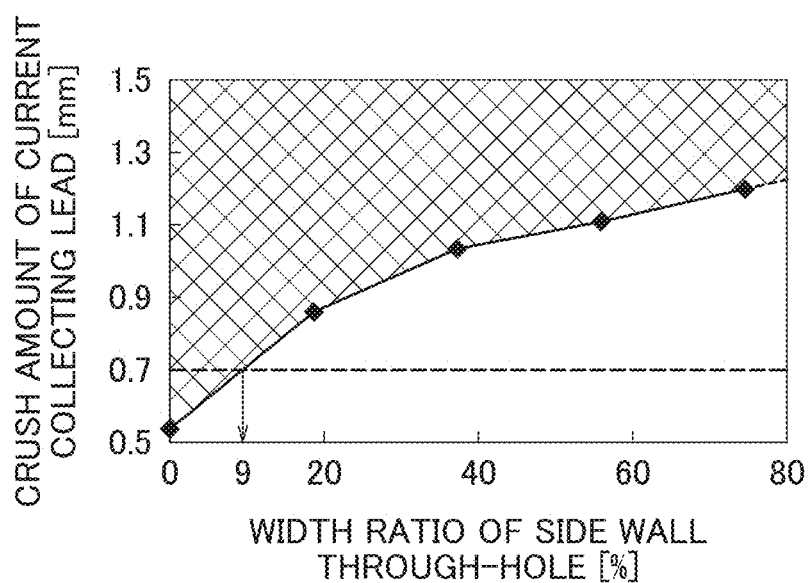
FIG. 28 is a graph showing a relation between the width ratio of the side wall through-hole and a crush amount of the current collecting lead.

Based on the results in the above Example 5, Example 7, Example 8, Example 9 and Example 10, FIG. 27 shows a change in the resistance value increasing rate of the current collecting lead when the ratio of the side wall through-hole height L2 to the side wall height L1 was fixed at 9% and the ratio of the side wall through-hole width W2 to the maximal side wall width W1 was changed, and FIG. 28 shows a change in the current collecting lead crush amount when the ratio of the side wall through-hole width W2 to the maximal side wall width W1 was changed. In FIG. 27, the ordinate indicates the resistance value increasing rate [%] of the current collecting lead, and the abscissa indicates the width ratio [%] of the side wall through-hole. In FIG. 28, the ordinate indicates the crush amount [mm] of the current collecting lead, and the abscissa indicates the width ratio [%] of the side wall through-hole.

Figure 29:
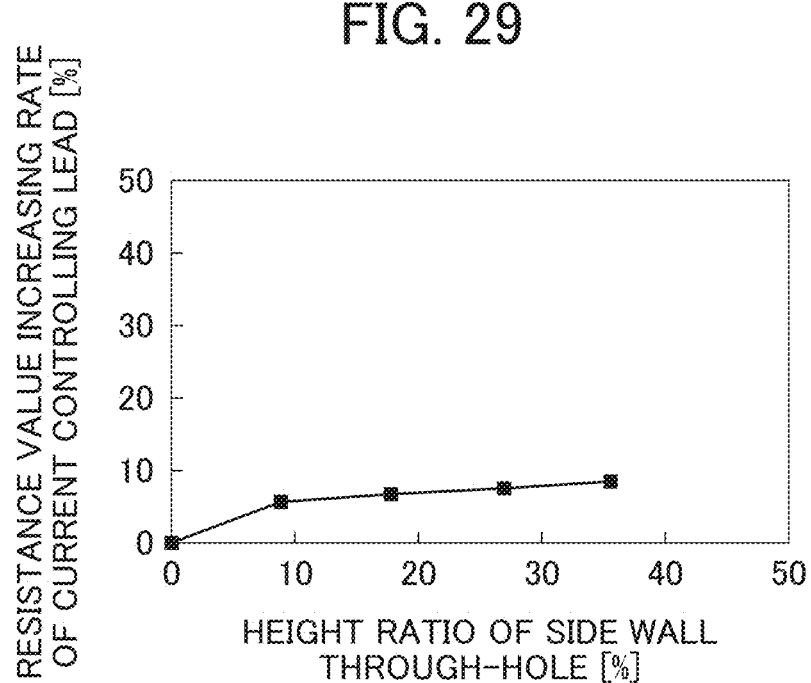
FIG. 29 is a graph showing a relation between a height ratio of the side wall through-hole and the resistance value increasing rate of the current collecting lead.
Figure 30:
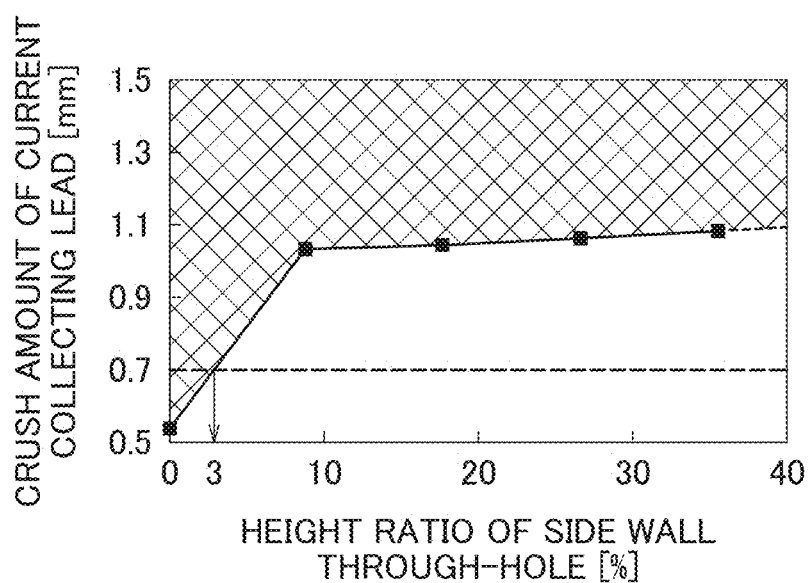
FIG. 30 is a graph showing a relation between the height ratio of the side wall through-hole and the crush amount of the current collecting lead.

Further, based on the results in Example 5, Example 8, Example 11, Example 12 and Example 13, FIG. 29 shows a change in the resistance value increasing rate of the current collecting lead when the ratio of the side wall through-hole width W2 to the maximal side wall width W1 was fixed at 37% and the ratio of the side wall through-hole height L2 to the side wall height L1 was changed, and FIG. 30 shows a change in the current collecting lead crush amount when the ratio of the side wall through-hole height L2 to the side wall height L1 was changed. In FIG. 29, the ordinate indicates the resistance value increasing rate [%] of the current collecting lead, and the abscissa indicates the height ratio [%] of the side wall through-hole. In FIG. 30, the ordinate indicates the crush amount [mm] of the current collecting lead, and the abscissa indicates the height ratio [%] of the side wall through-hole.

In Example 5, since the side wall through-holes were not provided, the ratio of the side wall through-hole height L2 to the side wall height L1 and the ratio of the side wall through-hole width W2 to the maximal side wall width W1 were 0%. Further, the current collecting lead crush amount in Example 5 was 0.54 mm.

[Consideration]

(1) The thicknesses of the current collecting leads in Examples 1 to 3 and Comparative Example 1 are sufficiently thicker compared to thicknesses of conventional positive electrode ribbons. Therefore, the batteries in Examples 1 to 3 and Comparative Example 1, which use the current collecting leads, are thought to have low internal resistance values and basically have good high-rate discharge characteristics, compared to conventional batteries.

(2) In comparative Example 1, the maximal load on the electrode group is 90.0 kgf, and is a higher value compared to Examples 1 to 3. It is thought that the current collecting lead in Comparative Example 1 is hard to deform at the time of the resistance spot welding and the crimping because the corner portions are right-angled corners, and the compressive load in the axis line direction of the battery is transmitted nearly directly to the electrode group.

On the other hand, in each of Examples 1 to 3, the maximal load on the electrode group is a lower value compared to Comparative Example 1. Since the corner portions are rounded corners, each current collecting lead in Examples 1 to 3 preferentially deforms at the time of the resistance spot welding and the crimping. Therefore, it is thought that the compressive load in the axis line direction of the battery is lessened at a portion of the current collecting lead and the maximal load on the electrode group is relatively low.

Thus, it is thought that the configuration of forming the corner portions of the current collecting lead as rounded corners contributes to the suppression of the occurrence of the internal short-circuit because it is possible to preferentially deform the current collecting lead and relatively reduce the load on the electrode group when the compressive load is applied.

(3) Here, when the maximal load on the electrode group exceeds 50.0 kgf, the deformation of the positive electrode current collector becomes large and the degree of the press to the electrode group becomes high. As a result, it is thought that the occurrence of the internal short-circuit due to the folding of the positive electrode or the negative electrode becomes frequent. When the maximal load on the electrode group is 50.0 kgf or less, the degree of the press to the electrode group due to the deformation of the positive electrode current collector is in a sufficiently acceptable range, and it is thought that the occurrence of the internal short-circuit due to the folding of the positive electrode or the negative electrode is suppressed.

Therefore, from the result in Table 1, it can be said that the curvature radius of the current collecting lead preferably should be 0.70 mm or larger in order to adjust the maximal load on the electrode group to 50.0 kgf or less for suppressing the occurrence of the internal short-circuit.

As described above, it is preferable that the curvature radius of the current collecting lead be larger.

However, when the curvature radius of the current collecting lead is too large, it is difficult to form a current collecting lead having a predetermined shape. Further, when the curvature radius of the current collecting lead is too large, there is a concern of the disadvantage that the current collecting lead deforms too easily and a necessary load cannot be obtained at the time of the resistance spot welding. Therefore, it is preferable to apply a load of 25 kgf or more, which is a load necessary for the resistance spot welding, to the electrode group. In order to adjust the maximal load on the electrode group to 25 kgf or more, it is preferable that the curvature radius of the current collecting lead be 1.2 mm or smaller.

(4) As shown in FIG. 14 showing the analysis results of the shapes of the current collecting lead 34, the positive electrode current collector 28 and the electrode group 4 before and after the resistance spot welding and the crimping, in Example 3 in which the curvature radius of the current collecting lead 34 is 0.40 mm, the deformation amount of the current collecting lead 34 itself is not very large, but the deformation is recognized in the current collector 28 and the electrode group 4 (the positive electrode connection edge portion 32).

On the other hand, in Example 2 in which the curvature radius is 0.70 mm and Example 1 in which the curvature radius is 0.90 mm, the amount of the deformation of the current collecting lead 34 itself is larger compared to Example 3. However, the deformation of the current collector 28 and the electrode group 4 (the positive electrode connection edge portion 32) is hardly recognized.

Also for this reason, it is thought that a larger curvature radius of the current collecting lead 34 suppresses the deformation of the electrode group 4 and a curvature radius of 0.70 mm or large is more preferable.

(5) Thus, it can be said that the configuration of forming the corner portions of the current collecting lead as rounded corners can provide the effect of suppressing the occurrence of the internal short-circuit while maintaining a good high-rate discharge characteristic. Further, it is can be said that the effect can be enhanced by restricting the range of the curvature radius of the rounded corner to some extent.

(6) Example 5

The current collecting lead in Example 5 is a current collecting lead in which the side wall through-holes are not drilled on the side walls, and the electric resistance value is 0.31 mΩ. As seen in FIGS. 23 and 24 showing the analysis result of the current distribution of the current collecting lead in Example 5, a slight change in color tone appears on the side walls 142, 144. The color tone of the gray color is light at the central portions of the side walls 142, 144, and the color of the gray color becomes darker with distance from the central portions of the side walls 142, 144. Therefore, it is found that a higher electric current flows with distance from the central portions of the side walls 142, 144. Further, in the battery produced by using the current collecting lead in Example 5, buckling spots were recognized at parts of the positive electrode connection edge portion 132 of the electrode group 104. The battery including the current collecting lead in Example 5 can cause the internal short-circuit, compared to the battery in Example 4 in which a buckling to cause the short-circuit was not recognized.

(7) Example 6

The current collecting lead in Example 6 easily deforms, because the side wall through-holes are not drilled on the side walls. Therefore, in the battery including the current collecting lead in Example 6, the current collecting lead preferentially deforms in the production process, and therefore, it is possible to suppress an excessive deformation of the positive electrode connection edge portion of the electrode group. This is evident from the fact that a buckling to cause the short-circuit at the positive electrode connection edge portion 32 was not recognized in the observation result of the internal condition of the battery including the current collecting lead in Example 6. Therefore, the battery including the current collecting lead in Example 6 is unlikely to cause the internal short-circuit, compared to the battery including the current collecting lead in Example 5. Meanwhile, as seen in FIGS. 25 and 26 showing the analysis result of the current distribution of the current collecting lead in Example 6, it is recognized that the color tone of the gray color is very dark at thin portions of the side walls 142, 144 that are adjacent to the side wall through-holes 164, 166. In the current collecting lead in Example 6, the side wall through-holes 164, 166 are provided so as to cross the current path imaginary lines 190. Therefore, the range in which electric current flows narrows, and the current density greatly increases. As a result, in the current collecting lead in Example 6, the electric resistance value increases as a whole. This is evident from the fact that the electric resistance value of the current collecting lead in Example 6 was 0.95 mΩ and was much higher compared to the electric resistance value of the current collecting lead in Example 5. When the electric resistance value is high in this way, the battery including the current collecting lead in Example 6 has a poor high-rate discharge characteristic, compared to the battery including the current collecting lead in Example 5. That is, it can be said that the current collecting lead in Example 6 contributes little to the enhancement of the high-rate discharge characteristic of the battery although having the effect of suppressing the internal short-circuit of the battery.

(8) Example 4

In the current collecting lead in Example 4, the electric resistance value is 0.35 mΩ, and the electric resistance value is slightly higher, compared to the current collecting lead in Example 5. Therefore, the battery including the current collecting lead in Example 4 is thought to have a high-rate discharge characteristic equivalent to that of the battery including the current collecting lead in Example 5. Here, as seen in FIGS. 21 and 22 showing the analysis result of the current distribution of the current collecting lead in Example 4, the change in the color tone of the current collecting lead in Example 4 is nearly the same as the change in the color tone of the current collecting lead in Example 5, and it can be said that the current collecting lead in Example 4 and the current collecting lead in Example 5 have a similar level of current density. Meanwhile, as compared to the current distribution of the current collecting lead in Example 6, since the side wall through-holes 164, 166 are provided at positions away from the current path imaginary lines 190, the current density of the current collecting lead in Example 4 is not as high as that of the current collecting lead in Example 6. Further, the current collecting lead in Example 4 deforms easily, because the side wall through-holes 164, 166 are drilled on the side walls 142, 144. Therefore, in the battery including the current collecting lead in Example 4, a buckling to cause the short-circuit at the positive electrode connection edge portion 132 of the electrode group 104 was not recognized. Accordingly, the battery including the current collecting lead in Example 4 is unlikely to cause the internal short-circuit, compared to the battery including the current collecting lead in Example 5.

As described above, since the side wall through-holes are provided at positions away from the current path imaginary lines on the side walls, the current collecting lead in Example 4 can suppress the increase in the electric resistance value due to the increase in the current density, and easily deforms. Therefore, the current collecting lead in Example 4 preferentially deforms at the time of the production of the battery and suppresses the deformation and buckling of the positive electrode connection edge portion of the electrode group, while maintaining an electric resistance value equivalent to that of the current collecting lead having no side wall through-hole. As a result, it can be said that the current collecting lead in Example 4 has the effect of suppressing the occurrence of the internal short-circuit in the battery while maintaining a good high-rate discharge characteristic of the battery.

(9) Width Ratio of Side Wall Through-Hole

From FIG. 27 showing the relation between the width ratio of the side wall through-hole and the resistance value increasing rate of the current collecting lead, it is found that the electric resistance value of the current collecting lead increases as the width of the side wall through-hole becomes larger. As understood from FIG. 27, in the case where the width ratio of the side wall through-hole is 60% or less, the resistance value increasing rate is 23% or less and is relatively low, allowing a little influence on the high-rate discharge characteristic, and in the case where the width ratio of the side wall through-hole is 40% or less, the resistance value increasing rate is less than 7% and is sufficiently low, allowing a very little influence on the high-rate discharge characteristic. Accordingly, it can be said that the width ratio of the side wall through-hole preferably should be 60% or less and more preferably should be 40% or less.

The current collecting lead is crushed in the assembly process for the battery, and when the crush amount of the current collecting lead is large, the load acts on the positive electrode current collector positioned under the current collecting lead. Thereby, the positive electrode connection edge portion of the electrode group easily buckles, causing the internal short-circuit. The current collecting lead crushes more easily as the size of the side wall through-hole becomes larger. Therefore, in the case where the crush amount when the current collecting lead crushes is the same between a first current collecting lead in which the size of the side wall through-hole is a first size and a second current collecting lead in which the size of the side wall through-hole is a second size smaller than the first size, the first current collecting lead having the larger first-size side wall through-hole crushes more easily (deforms more easily) than the second current collecting lead, and therefore, reduces the load on the positive electrode current collector. Therefore, in the case where the first current collecting lead is used, the buckling of the positive electrode connection edge portion is harder to occur, compared to the case where the second current collecting lead is used. FIG. 28 shows the relation between the width ratio of the side wall through-hole and the crush amount of the current collecting lead. In the graph of FIG. 28, a region where the buckling of the positive electrode connection edge portion occurs is shown by hatching, as a defective region. Although the current collecting lead is crushed in the production process for the battery, it is necessary that the crush amount of the current collecting lead does not fall within the defective region where the buckling of the positive electrode connection edge portion occurs. Ordinarily, at the time of the assembly of the battery, the space between the positive electrode current collector and the sealing body in the outer can of the battery, at which the current collecting lead is disposed, is compressed in the axis line direction of the battery by up to 0.7 mm. Therefore, it is necessary to avoid the crush amount from falling within the defective region even when the current collecting lead is crushed by 0.7 mm. Here, as seen in FIG. 28, in the case where the width ratio of the side wall through-hole of the current collecting lead is 0% (with no side wall through-hole), the crush amount of the current collecting lead, at 0.7 mm, thoroughly falls within the defective region where the positive electrode connection edge portion buckles. However, it is found that, in the case where the width ratio of the side wall through-hole is 9% or more, it is possible to avoid the crush amount from falling within the defective region even when the current collecting lead is crushed by 0.7 mm. Accordingly, it is found to be effective to set the width ratio of the side wall through-hole to 9% or more for suppressing the occurrence of the buckling of the positive electrode connection edge portion.

Thus, it can be said that the width ratio of the side wall through-hole preferably should be 9% or more and 60% or less, and more preferably should be 9% or more and 40% or less.

(10) Height Ratio of Side Wall Through-Hole

From FIG. 29 showing the relation between the height ratio of the side wall through-hole and the resistance value increasing rate of the current collecting lead, it is found that the change in the increasing rate of the electric resistance value of the current collecting lead is small even when the dimension of the height of the side wall through-hole becomes large.

FIG. 30 shows the relation between the height ratio of the side wall through-hole and the crush amount of the current collecting lead. In the graph of FIG. 30, a region where the buckling of the positive electrode connection edge portion occurs is shown by hatching, as a defective region. From FIG. 30, it is found that the crush amount can be avoided from falling within the defective region when the height ratio of the side wall through-hole of the current collecting lead is 3% or more.

From FIG. 30, it can be said that the crush amount of the current collecting lead is less influenced by the height ratio of the side wall through-hole than by the width ratio of the side wall through-hole. Therefore, it can be said that the height ratio of the side wall through-hole of the current collecting lead has less influence on the effect of suppressing the occurrence of the internal short-circuit in the battery while maintaining a good high-rate discharge characteristic of the battery. Accordingly, it can be said that the height of the side wall through-hole of the current collecting lead may be set only in consideration of the ease of the production of the current collecting lead.

The present invention is not limited to the above embodiments and examples, and various modifications can be made. For example, the type of the battery is not limited to the nickel-hydrogen secondary battery, and may be a nickel-cadmium secondary battery, a lithium-ion secondary battery or the like. Further, in the present invention, the shape of the battery is not particularly limited, and may be a cylindrical secondary battery or a rectangular secondary battery.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A current collecting lead for a secondary battery, the current collecting lead being interposed between a sealing body and a current collector for connecting the sealing body and the current collector, the sealing body including a terminal, the current collector being attached to an electrode group,
the current collecting lead including: a top wall that is positioned on a side of the sealing body; a bottom wall that is positioned on a side of the current collector and that faces the top wall; and a pair of side walls that extend between side edges of the top wall and side edges of the bottom wall and that face each other, and corner portions formed by the top wall and the side walls and corner portions formed by the bottom wall and the side walls being rounded corners that are curved;
wherein:
the top wall includes a top wall welding-intended portion where a welding portion is formed at a time of welding with the sealing body,
the bottom wall includes a bottom wall welding-intended portion where a welding portion is formed at a time of welding with the current collector, and
a configuration of the top wall and the side wall are such that an imaginary line is defined that extends across the top wall, the side wall and the bottom wall and that joins the top wall welding-intended portion and the bottom wall welding-intended portion by the shortest way, and the side wall has a side wall through-hole that is located at a position away from the imaginary line, the side wall through-hole including an inner peripheral edge in the side wall that does not extend to an outer peripheral edge of the side wall.

2. The current collecting lead according to claim 1, wherein a curvature radius D of the rounded corners has at least a minimum value for suppressing deformation of the current collector and thereby inhibiting the current collector from pressing the electrode group in response to a load perpendicular to the flat top wall and/or the flat bottom wall, the minimum value being inversely related to a thickness of a material composing the current collecting lead, and
wherein the thickness of the material composing the current collection lead is greater than 0.25 mm, and a thickness of the current collector is greater than 0.25 mm and less than or equal to 0.40 mm.

3. The current collecting lead according to claim 1, wherein:
a thickness of a material composing the current collecting lead is 0.30 mm, and a curvature radius D of the rounded corners satisfies a relation of 0.7 mm≤D≤1.2 mm.

4. The current collecting lead according to claim 1, wherein the side wall through-hole has a shape selected from the group consisting of a circular shape, an elliptical shape, a rounded rectangular shape, and an oval shape.

5. A production method for a secondary battery including a current collecting lead, the production method comprising:
a current collecting lead preparation step of preparing the current collecting lead according to claim 1;
an electrode group preparation step of preparing an electrode group that is formed by overlapping a positive electrode and a negative electrode with a separator therebetween;
an electrode group placement step of placing the electrode group into an outer can;
a welding step of performing welding between the electrode group and a current collector put on the electrode group, welding between the current collector and the current collecting lead put on the current collector, and welding between the current collecting lead and a sealing body put on the current collecting lead, under pressure, the sealing body including a terminal; and
a sealing step of attaching the sealing body to the outer can by crimping, to seal the outer can.

* * * * *